United States Patent
Lee et al.

(10) Patent No.: US 10,951,351 B2
(45) Date of Patent: Mar. 16, 2021

(54) METHOD AND DEVICE FOR PERFORMING COMMUNICATION USING ORTHOGONAL OR NON-ORTHOGONAL CODE MULTIPLE ACCESS SCHEME IN WIRELESS COMMUNICATION SYSTEM

(71) Applicant: LG Electronics Inc., Seoul (KR)

(72) Inventors: Hojae Lee, Seoul (KR); Sangrim Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/499,716

(22) PCT Filed: Mar. 22, 2018

(86) PCT No.: PCT/KR2018/003359
§ 371 (c)(1),
(2) Date: Sep. 30, 2019

(87) PCT Pub. No.: WO2018/182233
PCT Pub. Date: Oct. 4, 2018

(65) Prior Publication Data
US 2020/0028611 A1  Jan. 23, 2020

Related U.S. Application Data

(60) Provisional application No. 62/478,615, filed on Mar. 30, 2017.

(51) Int. Cl.
*H04L 1/00* (2006.01)
*H04J 99/00* (2009.01)
(Continued)

(52) U.S. Cl.
CPC ............ *H04L 1/0011* (2013.01); *H04J 15/00* (2013.01); *H04W 72/1268* (2013.01); *H04W 72/14* (2013.01)

(58) Field of Classification Search
None
See application file for complete search history.

(56) References Cited

U.S. PATENT DOCUMENTS

2016/0150544 A1  5/2016  Nikopour et al.
2016/0262167 A1  9/2016  Lan et al.
(Continued)

FOREIGN PATENT DOCUMENTS

| WO | WO2016153555 | 9/2016 |
| WO | WO2016165095 | 10/2016 |
| WO | WO2017026700 | 2/2017 |

*Primary Examiner* — Christine T Duong
(74) *Attorney, Agent, or Firm* — Fish & Richardson P.C.

(57) ABSTRACT

Provided is a method and device for transmitting uplink data by using a non-orthogonal code multiple access scheme in a wireless communication system. Specifically, a terminal supporting multiple layers receives an NoMA MCS index from a base station. The NoMA MCS index is selected from an NoMA MCS table on the basis of the quality of an uplink channel. The NoMA MCS table is defined in advance as a table including the NoMA MCS index, the number of multiple layers, and a modulation order. The number of multiple layers is determined according to the NoMA MCS index. The terminal transmits the uplink data configured on the basis of the NoMA MCS index, via the multiple layers.

14 Claims, 16 Drawing Sheets

(51) Int. Cl.
*H04W 72/12* (2009.01)
*H04W 72/14* (2009.01)

(56) References Cited

U.S. PATENT DOCUMENTS

2018/0183503 A1* 6/2018 Rahman .............. H04W 72/042
2019/0229863 A1* 7/2019 Lei ....................... H04L 5/0014

* cited by examiner

METHOD AND DEVICE FOR PERFORMING COMMUNICATION USING ORTHOGONAL OR NON-ORTHOGONAL CODE MULTIPLE ACCESS SCHEME IN WIRELESS COMMUNICATION SYSTEM

CROSS-REFERENCE TO RELATED APPLICATIONS

This application is a National Stage application under 35 U.S.C. § 371 of International Application No. PCT/KR2018/003359, filed on Mar. 22, 2018, which claims the benefit of U.S. Provisional Application No. 62/478,615 filed on Mar. 30, 2017. The disclosures of the prior applications are incorporated by reference in their entirety.

BACKGROUND OF THE INVENTION

Field of the Invention

The present specification relates to wireless communication, and more particularly, to a method of performing communication by using an orthogonal or non-orthogonal coded multiple access scheme, and a device using the method.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification provides a method and apparatus for performing communication by using an orthogonal or non-orthogonal coded multiple access scheme in a wireless communication system.

The present specification proposes a method and apparatus for performing communication by using a non-orthogonal coded multiple access scheme in a wireless communication system.

The apparatus includes a transceiver transmitting and receiving a radio signal, and a processor coupled to the transceiver.

That is, a wireless communication system environment in which a user equipment (UE) supporting multi-layers performs communication by using non-orthogonal multiple access (NoMA) is assumed in the present embodiment. That is, a multi-layer transmission scheme based on NoMA will be proposed as a scheme of transmitting signals for multiple users through superposition in the same time-frequency resource.

First, summarizing terminologies, a layer may correspond to a path through which signals can be transmitted independently in time and frequency resources. Therefore, the layer may also be used in the same meaning as a stream. If a single UE supports a plurality of layers, the layers may be allocated to respective transmit antennas by being multiplied by a specific precoding matrix according to a channel state by means of a precoding module. Therefore, the layer may also mean an antenna layer. The present embodiment assumes a case where the single UE transmits/receives signals through the multi-layers.

First, the UE receives a NoMA modulation and coding scheme (MCS) index and a codebook index from a base station (BS). The NoMA MCS index and the codebook index may be signaled to the UE through an uplink (UL) grant. In this case, a non-orthogonal codebook or non-orthogonal codebook set including the codebook index may be pre-defined between the UE and the BS.

The NoMA MCS index is selected from a NoMA MCS table based on quality of a UL channel. The UE may transmit a scheduling request signal to the BS. In this case, the quality of the UL channel may be estimated based on the scheduling request signal.

The NoMA MCS table is pre-defined as a table including the NoMA MCS index, the number of multi-layers, and a modulation order. That is, the NoMA MCS which supports the multi-layers may be defined as a table by the number of multi-layers. The number of multi-layers is determined based on the NoMA MCS index. The codebook index is selected from a codebook set related to the modulation order based on the number of multi-layers.

Since a multi-dimensional modulation (MM) based NoMA technique may have a different codebook set according to a modulation order, a NoMA MCS table may be defined differently for each modulation order. In addition, the NoMA MCS for various modulation orders may be defined as one NoMA MCS table. However, the present embodiment considers the NoMA MCS table capable of achieving spectral efficiency related to the modulation order of 2.

In addition, the NoMA MCS table may further include a transport block size (TBS) index and a code rate related to the NoMA MCS index. That is, the NoMA MCS index may be defined together with the number of multi-layers, the modulation order, the code rate, and the TBS index. The TBS index may indicate a TBS for the multi-layers. The TBS for the multi-layers may be a value obtained by multiplying a TBS for a single layer by the number of multi-layers. Accordingly, spectral efficiency of the TBS for the multi-layers may also be a value obtained by multiplying the TBS for the single layer by the number of multi-layers.

The UE may transmit the UL data configured based on the NoMA MCA index and/or the codebook index through the multi-layers. The UL data may be spread for each of the multi-layers based on a codebook related to the codebook index, and may be transmitted through superposition with respect to another UE in the same time-frequency resource. The UL data may be transmitted to the BS through xPUSCH.

In addition, the NoMA MCS index may be tied with an index of the codebook set related to the modulation order. The codebook set may be detected from the NoMA MCS index by the UE. Accordingly, the BS does not have to additionally perform signaling on the index of the codebook set.

Hereinafter, a method of allocating a codebook index based on NoMA MCS is proposed.

For example, the codebook index may be pre-defined as an allocation pattern for each of a plurality of UEs including the aforementioned UE. The allocation pattern may be a pattern which allocates the codebook indices, which are as many as the number of multi-layers, to the UE based on the maximum number of multi-layers and the maximum number of codebook indices.

For example, if the NoMA MCS index is 3, the number of multi-layers that can be supported by each UE is 4, and each UE may use the four multi-layers to define an allocation pattern in which the codebook index is superposed to the minimum extent possible. That is, for each UE, a pattern may be defined by allocating the codebook index in such a manner that the codebook index is superposed to the minimum extent possible for each layer.

In another embodiment, the codebook index may be defined through a modulo operation using an identification (ID) of the UE based on the maximum number of multi-layers and the maximum number of codebook indices.

For example, if the UE knows that the number of multi-layers is 3 through the NoMA MCS index, the UE may know that three codebook indices in total are multi-layer codebook indices to be used by the UE by using the ID of the UE. The three codebook indices may be obtained, for example, as a value obtained by performing a modulo operation of 2 with respect to UE-ID, a value obtained by adding 2 to the value obtained by performing the modulo operation of 2 with respect to UE-ID, a value obtained by adding 4 to the value obtained by performing the modulo operation of 2 with respect to UE-ID.

The proposed scheme can be used to prevent a change in multi-user interference based on a change in a multi-user channel of non-orthogonal coded multiple access (NCMA) and maintain a uniform interference amount, thereby increasing MUD performance of a receiving side. In particular, in case of a codebook in which a modulation order and a codeword are associated, the greater the size of the modulation order, the greater the size of the codebook, which results in the use of many memories in a hardware implementation. In this case, capacity of all users is supported through a low modulation order by using a layer, thereby enabling a simple implementation.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
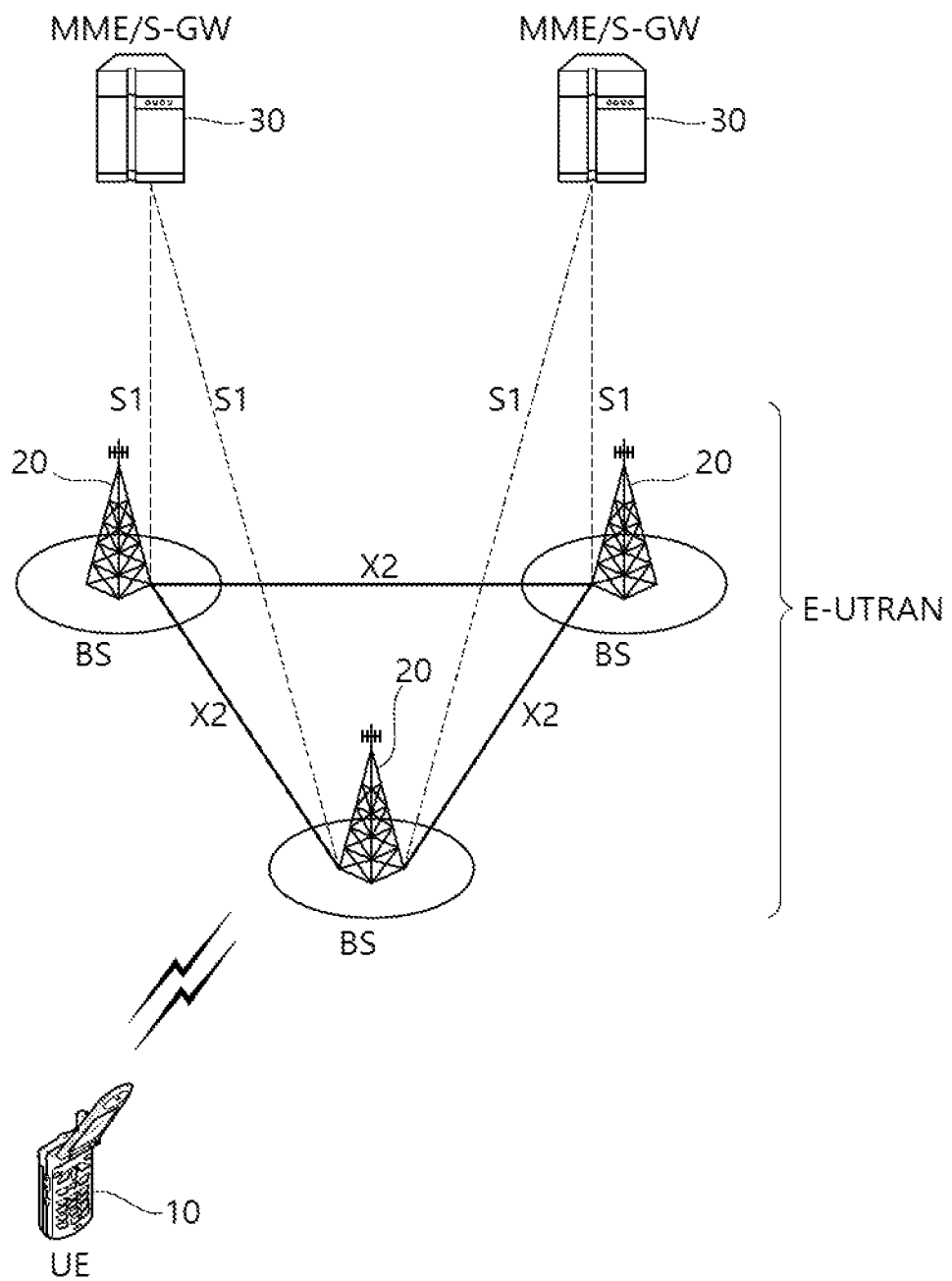
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
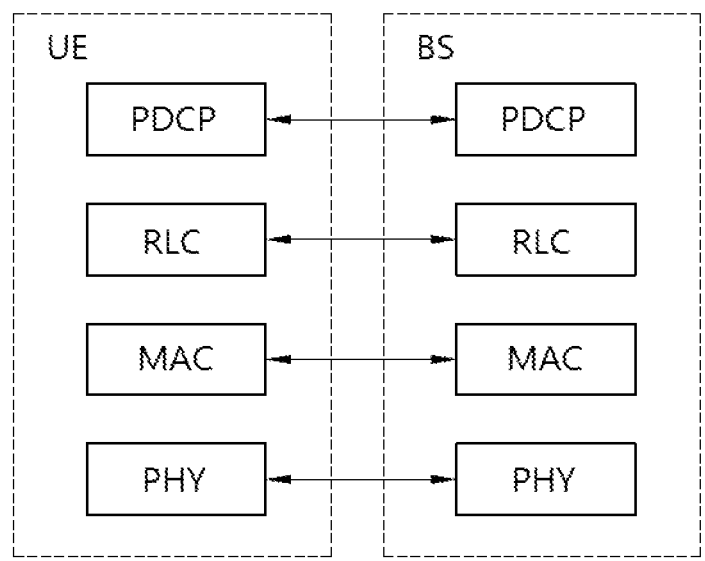
FIG. 2 is a diagram illustrating a radio protocol architecture for a user plane.
Figure 3:
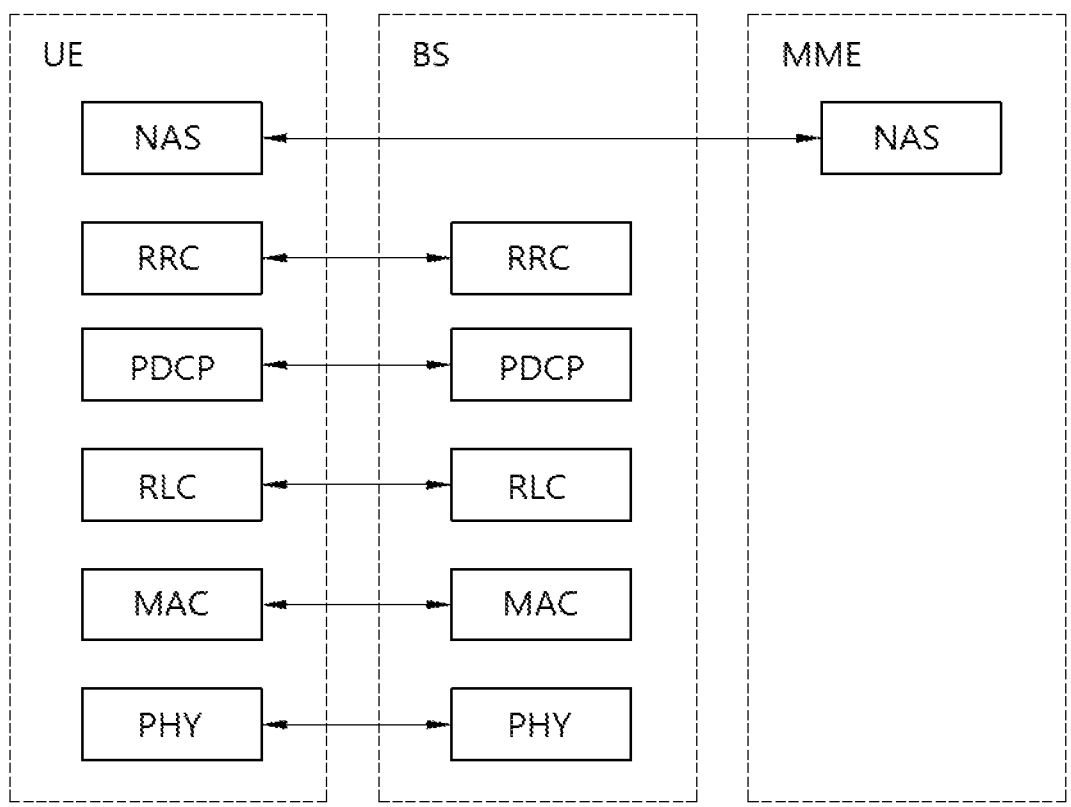
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
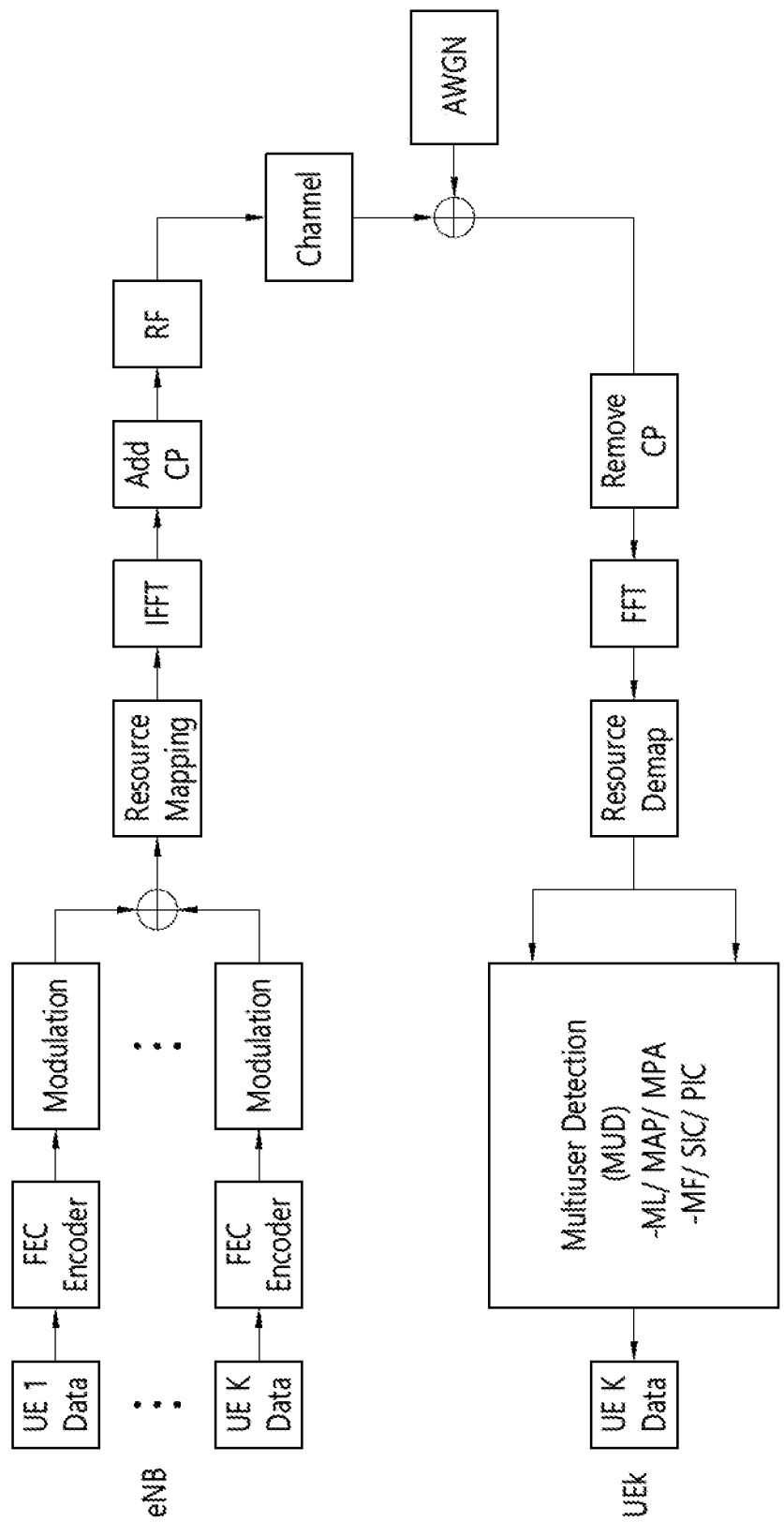
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
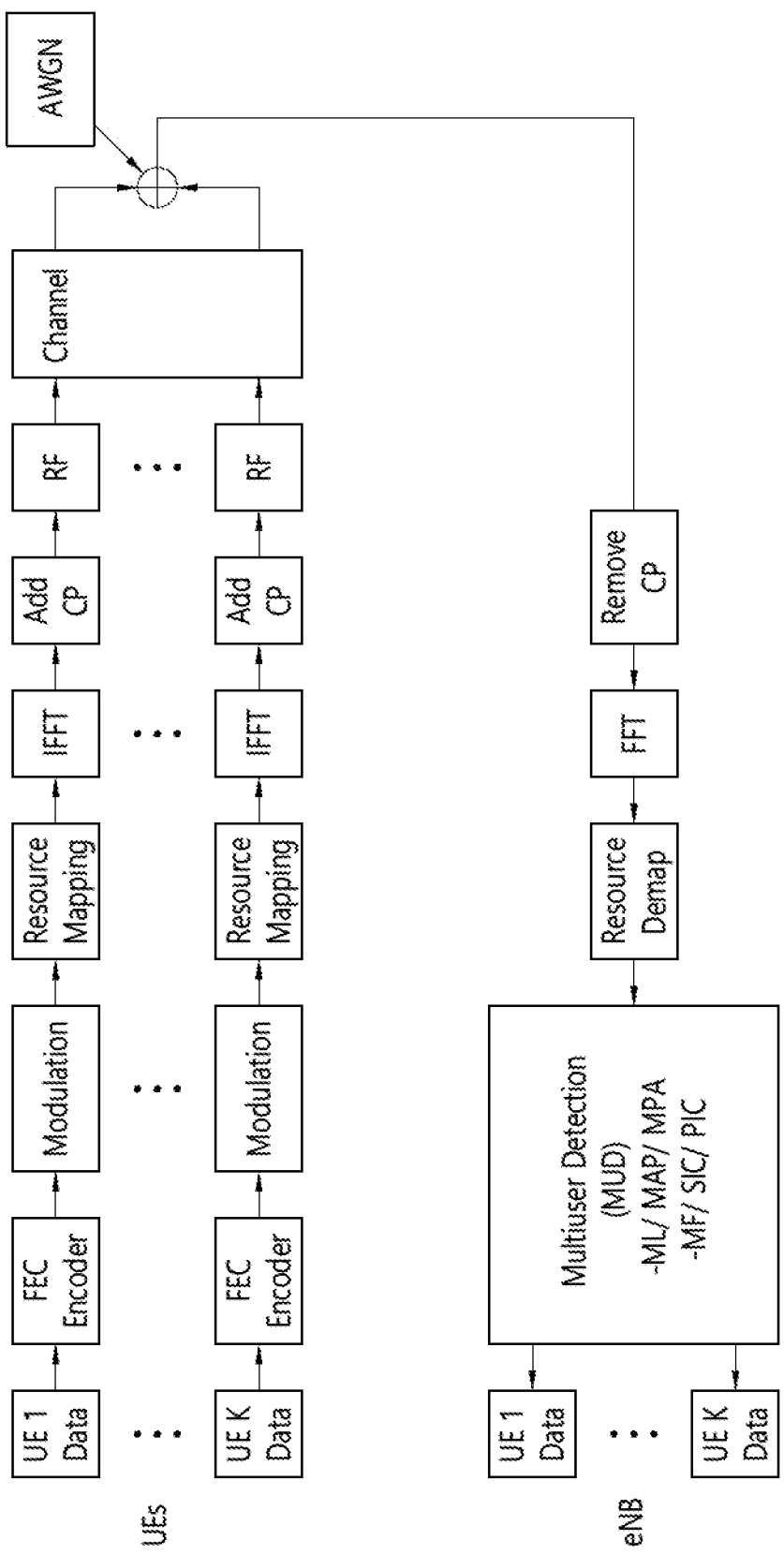
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{|\sum_{n \neq k, n=1}^{K} h_k s_n|^2 + \sigma_k}\right) =$$

$$\log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
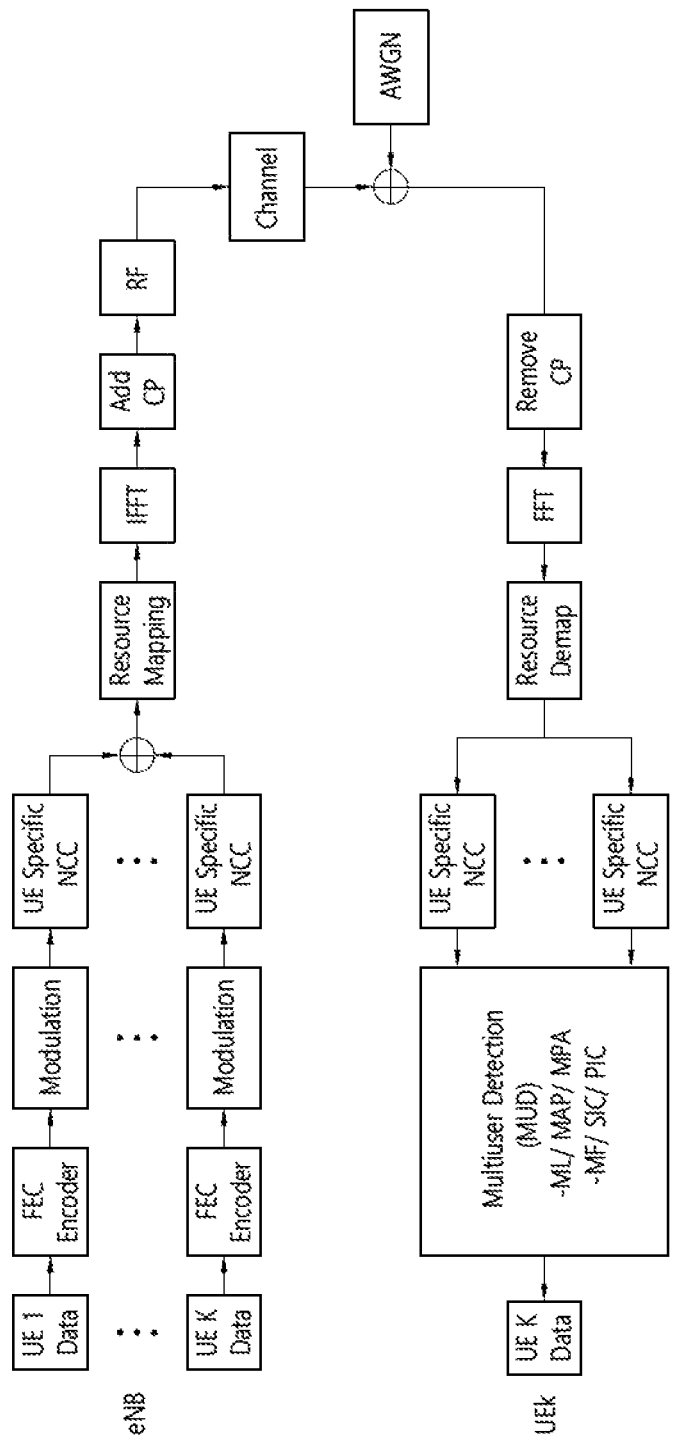
FIG. 6 is a block diagram illustrating NCMA based downlink transmission/reception (Tx/Rx) of a communication apparatus.
Figure 7:
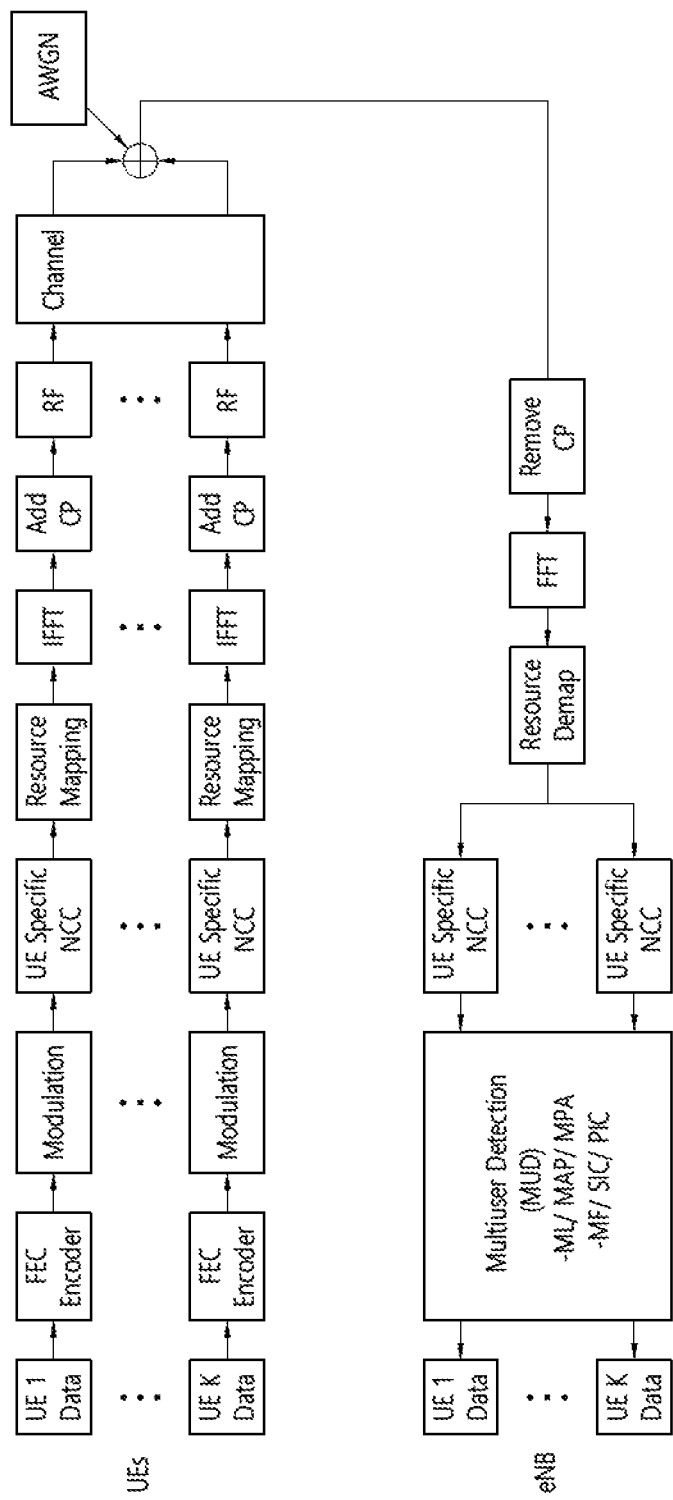
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [\, c^{(1)} \; \ldots \; c^{(K)} \,] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_c (\max_{1 \leq k \leq j \leq K} \sqrt{1 - |c^{(k)*} \cdot c^{(j)}|^2})$, $C \subset \mathbb{C}^{N \times K}$ The UE-specific NCC has features as expressed by the following Equation 4.

$$\begin{cases} |c^{(k)*} \cdot c^{(k)}| = 1, \forall k, k = 1, \ldots, K, \\ \text{if } N > K, |c^{(k)*} \cdot c^{(j)}| = \delta, \forall k, \forall j, k = 1, \ldots, K, j = 1, \ldots, K, \\ \text{if } N \leq K, |c^{(k)*} \cdot c^{(j)}| = 0, \forall k, \forall j, k = 1, \ldots, K, j = 1, \ldots, K. \end{cases} \quad \text{[Equation 4]}$$

In this case, $c^{(k)*}$ is a conjugate codeword of c(k). The features of the Equation are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (Nx1) dimension, if the receiver performs decoding using its codewords, 1 is decoded from its codeword, and statistical interference of $\delta_{N,K}$(K-1) remains from another K-1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook [$c^{(1)} \ldots c^{(K)}$] |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -06440 - 0.5906i & -0.1657 + 0.2160i & -0.5775 - 0.2480i \\ 0.4510 + 0.1709i & -0.4452 + 0.1956i & 0.9349 - 0.2279i & -03586 - 0.6902i \end{bmatrix}$ |

Table 2 illustrates a codebook in case of Spreading Factor N=4.

TABLE 2

| # of codewords (Max. # of users: K) | Examples of spreading codebook [$c^{(1)} \ldots c^{(K)}$] |
|---|---|
| 4 | $\begin{bmatrix} 1 & 1 & 1 & 1 \\ 1 & 1 & 1 & 1 \\ 1 & 1 & -1 & -1 \\ 1 & -1 & -1 & 1 \end{bmatrix}$ |
| 6 | $\begin{bmatrix} -0.0557-0.4476i & -0.1684-0.8131i & -0.0149+0.2205i & \cdots \\ & -0.0198-0.1206i & -0.3294-0.3689i & -0.0487+0.4148i \\ 0.0423-0.1460i & -0.4021+0.2118i & -0.6703+0.0282i & \cdots \\ & -0.6521-0.4251i & -0.0729-0.0903i & -0.2158-0.3003i \\ -0.1499-0.3961i & 0.0471-0.2647i & 0.3131-0.5204i & \cdots \\ & -0.5576-0.0206i & 0.6726-0.0552i & 0.0357+0.0924i \\ 0.5675+0.3346i & -0.0866+0.1577i & -0.0287+0.3624i & \cdots \\ & -0.0286+0.2589i & 0.4567-0.2792i & 0.6985+0.4372i \end{bmatrix}$ |
| 8 | $\begin{bmatrix} -0.2381-0.8369i & -0.6599-0.1222i & -0.6557-0.1776i & 0.1561+0.0861i & \cdots \\ & -0.1374+0.1275i & -0.1849+0.3859i & -0.2426-0.2248i & -0.1703-0.0604i \\ -0.2593-0.3320i & 0.4906+0.0221i & 0.3934+0.2749i & -03453-0.2068i & \cdots \\ & -0.5596+0.0272i & 0.0616+0.0315i & -0.3027-0.3133i & -0.7664+0.1256i \\ 0.1249+0.0320i & 0.0425+0.3856i & 0.0440-0.3295i & -0.3979+0.0525i & \cdots \\ & -0.5272-0.2195i & 0.0649-0.8770i & -0.2452+0.4427i & -0.0149-0.4727i \\ -0.2180-0.0342i & 0.3968-0.0250i & -0.3444-0.2811i & -0.7817-0.1845i & \cdots \\ & 0.2417+0.5162i & 0.1956-0.0203i & 0.4625-0.4805i & 0.0794-0.3663i \end{bmatrix}$ |

Various values may be obtained using mathematical equation or algorithm in addition to the above Tables 1 and 2.

Figure 8:
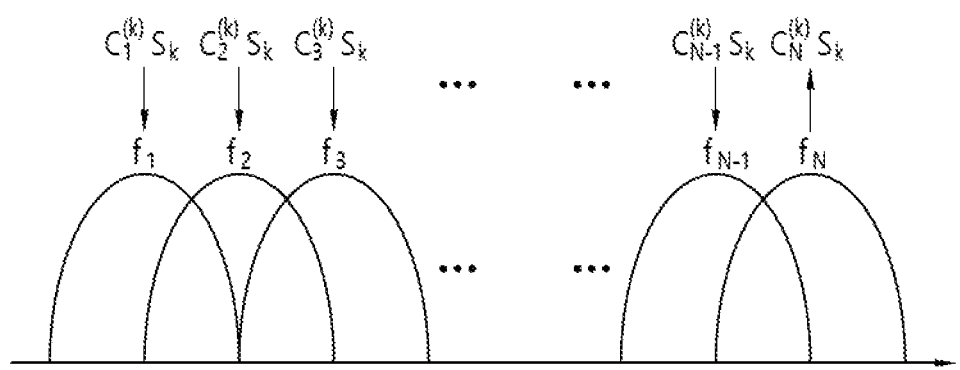
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol $s_k$ corresponds to a codeword vector $c^{(k)}$ of (Nx1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
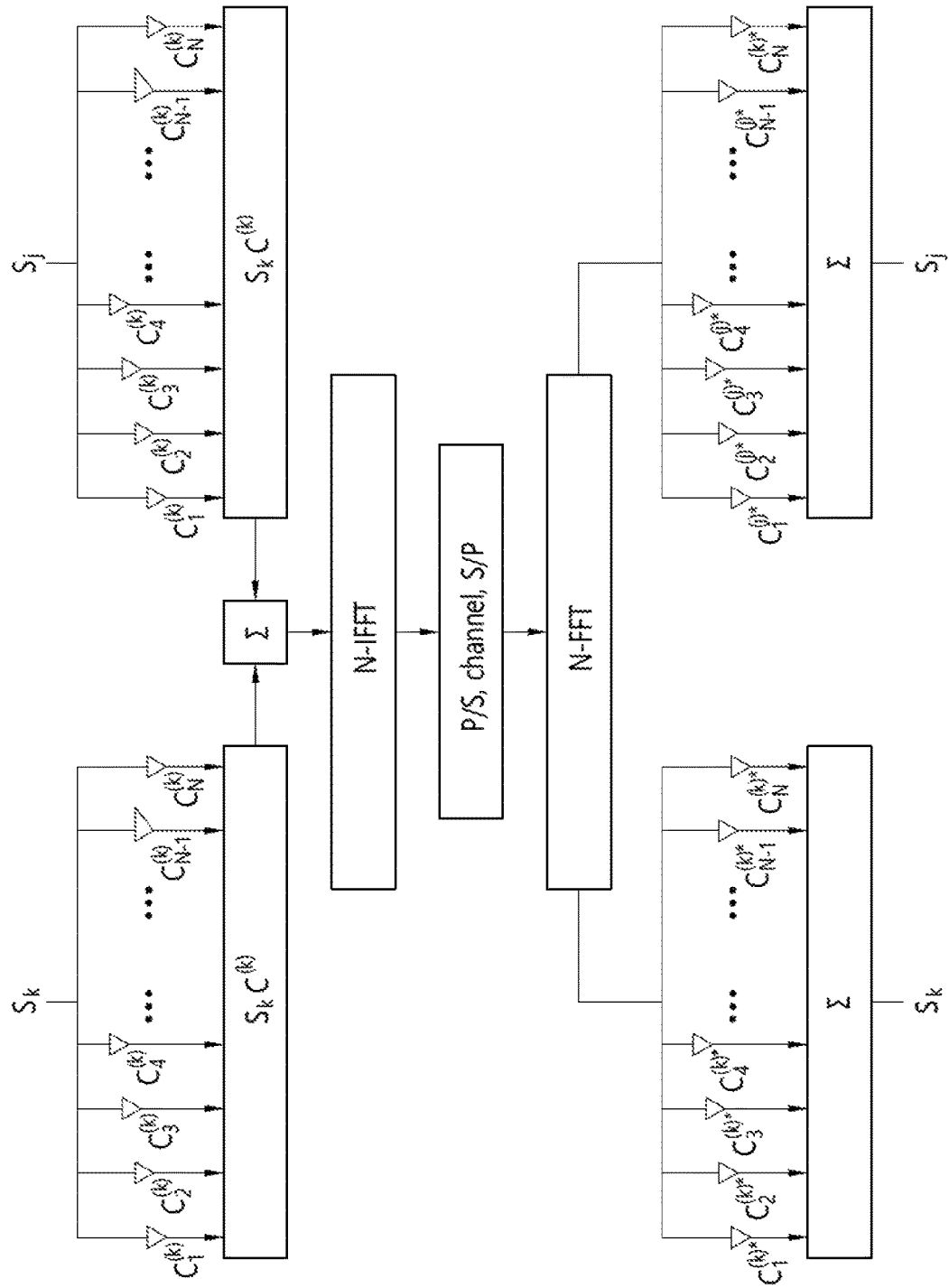
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k, \quad \text{[Equation 5]}$$

$$\hat{y}_k = \left[\frac{[y_k]_j}{[H_k]_{j,j}}\right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (Nx1) UE-specific NCC vector for the receiver at the kth transmitter, $s_k$ is a data symbol to the kth receiver, and n means (Nx1) signal noise vector. K is the number of multi-UEs allocated to the same time-frequency resource. In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} \cdot s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \left[\frac{[y_k]_j}{[H_k]_{j,j}}\right]_{j=1,\ldots,N} = \quad \text{[Equation 8]}$$

$$c^{(k)} s_k + \sum_{n=1}^{K} \left[\frac{[H_n]_{j,j}}{[H_k]_{j,j}}\right]_{j=1,\ldots,N} c^{(n)} s_n + \hat{n},$$

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k = c^{(k)*} \cdot c^{(k)} s_k + \quad \text{[Equation 9]}$$

$$\sum_{n \neq k, n=1}^{K} c^{(k)*} \cdot \left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

In addition, among other NoMA schemes, a NoMA scheme which spreads an encoded bits stream to a complex symbol vector based on modulation and a non-orthogonal codebook may also be considered. The scheme is a multi-dimensional modulation (MM) based NoMA scheme based on NoMA, and sparsity may exist or may not exist. Examples of the aforementioned operation are as follows.

Figure 10:
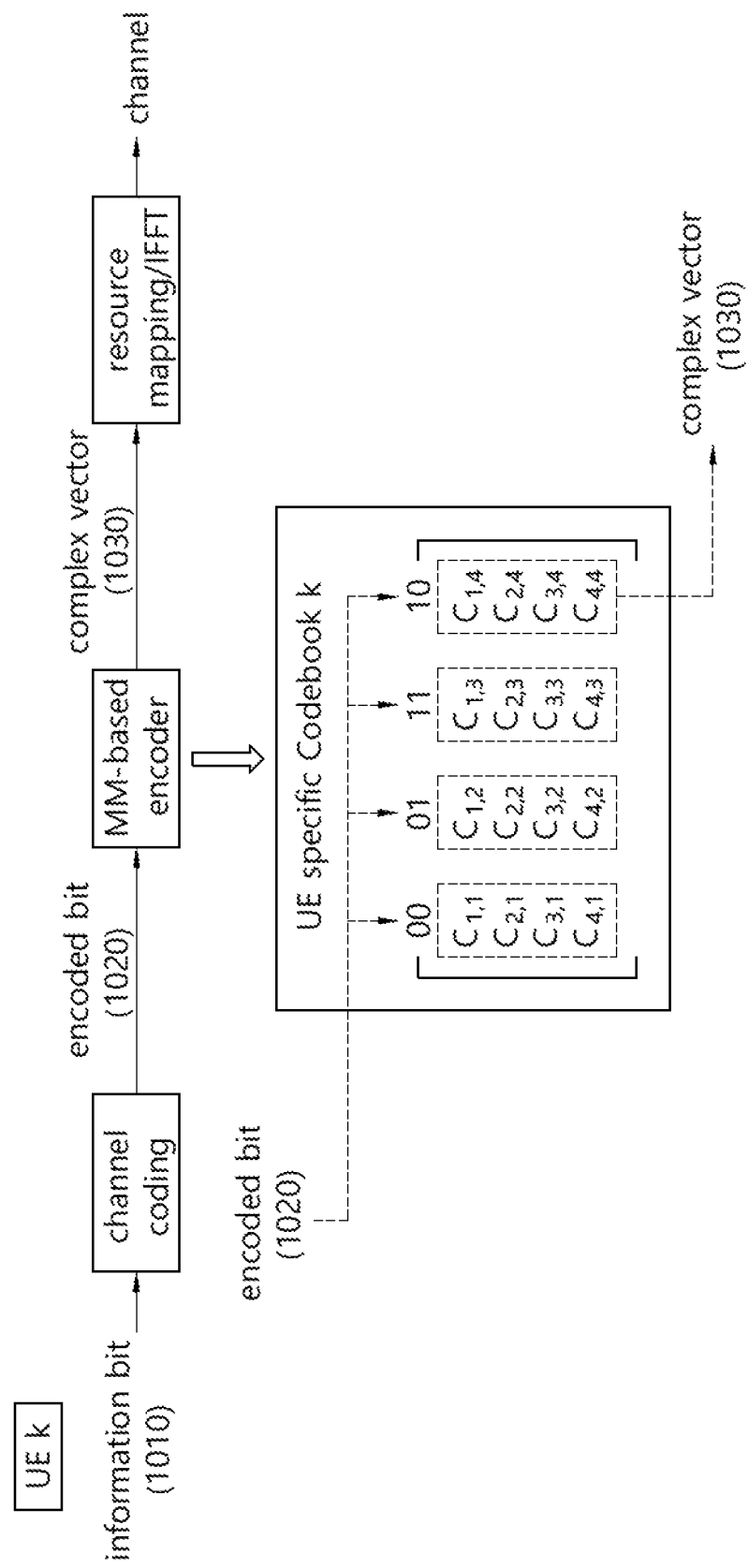
FIG. 10 shows an example of a NoMA operation of a transmitting side for applying multi-dimensional modulation (MM) according to the present embodiment.

FIG. 10 shows an example of a NoMA operation of a transmitting side for applying multi-dimensional modulation (MM) according to the present embodiment.

Among spread-based multiple-access techniques, a NoMA technique based on MM also performs encoding based on a UE-specific codeword (or codebook), and spreading is applied. Examples of the MM-based NoMA operation may be as shown in FIG. 10.

Referring to FIG. 10, in a UE k which performs uplink transmission, an information bit stream 1010 based on generated traffic is generated, and is converted into an encoded bit stream 1020 through channel coding. Then, a bit encoded by an MM-based encoder is converted into a complex vector 1030 based on a UE-specific codebook (or codeword) k. In the example of FIG. 10, it can be said that a 2-bit encoded bit is converted into a complex vector consisting of 4 complex symbols. For example, an encoded bit [0 0] is converted into a complex vector $[c_{1,1}, c_{2,1}, c_{3,1}, c_{4,1}]^T$. An encoded bit [0 1] is converted into a complex vector $[c_{1,2}, c_{2,2}, c_{3,2}, c_{4,2}]^T$. An encoded bit [1 1] is converted into a complex vector $[c_{1,3}, c_{2,3}, c_{3,3}, c_{4,3}]^T$. An encoded bit [1 0] is converted into a complex vector $[c_{1,4}, c_{2,4}, c_{3,4}, c_{4,4}]^T$.

The converted complex vector is transmitted using IFFT through resource mapping. The aforementioned operation is similarly applied also to a downlink transmission operation. In a receiving side, MUD such as a message passing algorithm (MPA) or the like may be used so as to be decoded into an encoded bit.

Hereinafter, a table which defines a relation between an MCS and a transport block size (TBS) is described. According to 3GPP TS, an MCS table is determined as shown in the following tables. In this case, $N_{PRB}=1$.

TABLE 3

| MCS Index $I_{MCS}$ | Modulation Order $Q_m$ | Modulation Order $Q_m'$ | TBS Index $I_{TBS}$ | TBS for $N_{PRB} = 1$ |
|---|---|---|---|---|
| 0 | 2 | 2 | 0 | 16 |
| 1 | 2 | 2 | 1 | 24 |
| 2 | 2 | 2 | 2 | 32 |
| 3 | 2 | 2 | 3 | 40 |
| 4 | 2 | 2 | 4 | 56 |

TABLE 3-continued

| MCS Index $I_{MCS}$ | Modulation Order $Q_m$ | Modulation Order $Q_m'$ | TBS Index $I_{TBS}$ | TBS for $N_{PRB} = 1$ |
|---|---|---|---|---|
| 5 | 2 | 4 | 5 | 72 |
| 6 | 2 | 4 | 6 | 328 |
| 7 | 2 | 4 | 7 | 104 |
| 8 | 2 | 4 | 8 | 120 |
| 9 | 2 | 4 | 9 | 136 |
| 10 | 4 | 6 | 9 | 136 |
| 11 | 4 | 6 | 10 | 144 |
| 12 | 4 | 6 | 11 | 176 |
| 13 | 4 | 6 | 12 | 208 |
| 14 | 4 | 6 | 13 | 224 |
| 15 | 4 | 6 | 14 | 256 |
| 16 | 4 | 6 | 15 | 280 |
| 17 | 6 | 6 | 15 | 280 |
| 18 | 6 | 6 | 16 | 328 |
| 19 | 6 | 6 | 17 | 336 |
| 20 | 6 | 6 | 18 | 376 |
| 21 | 6 | 6 | 19 | 408 |
| 22 | 6 | 6 | 20 | 440 |
| 23 | 6 | 6 | 21 | 488 |
| 24 | 6 | 6 | 22 | 520 |
| 25 | 6 | 6 | 23 | 552 |
| 26 | 6 | 6 | 24 | 584 |
| 27 | 6 | 6 | 25 | 616 |
| 28 | 6 | 6 | 26/26A | 712/632 |
| 29 | 2 | 2 | reserved | |
| 30 | 4 | 4 | | |
| 31 | 6 | 6 | | |

TABLE 4

| MGS Index $I_{MCS}$ | Modulation Order $Q_m$ | Modulation Order $Q_m'$ | TBS Index $I_{TBS}$ | TBS for $N_{PRB} = 1$ |
|---|---|---|---|---|
| 0 | 2 | 2 | 0 | 16 |
| 1 | 2 | 2 | 2 | 32 |
| 2 | 2 | 2 | 4 | 56 |
| 3 | 2 | 4 | 6 | 328 |
| 4 | 2 | 4 | 8 | 120 |
| 5 | 4 | 6 | 10 | 144 |
| 6 | 4 | 6 | 11 | 176 |
| 7 | 4 | 6 | 12 | 208 |
| 8 | 4 | 6 | 13 | 224 |
| 9 | 4 | 6 | 14 | 256 |
| 10 | 4 | 8 | 15 | 280 |
| 11 | 6 | 8 | 16 | 328 |
| 12 | 6 | 8 | 17 | 336 |
| 13 | 6 | 8 | 18 | 376 |
| 14 | 6 | 8 | 19 | 408 |
| 15 | 6 | 8 | 20 | 440 |
| 16 | 6 | 8 | 21 | 488 |
| 17 | 6 | 8 | 22 | 520 |
| 18 | 6 | 8 | 23 | 552 |
| 19 | 6 | 8 | 24 | 584 |
| 20 | 8 | 8 | 25 | 616 |
| 21 | 8 | 8 | 27 | 648 |
| 22 | 8 | 8 | 28 | 680 |
| 23 | 8 | 8 | 29 | 712 |
| 24 | 8 | 8 | 30 | 776 |
| 25 | 8 | 8 | 31 | 808 |
| 26 | 8 | 8 | 32 | 840 |
| 27 | 8 | 8 | 33/33A | 968/840 |
| 28 | 2 | 2 | reserved | |
| 29 | 4 | 4 | | |
| 30 | 6 | 6 | | |
| 31 | 8 | 8 | | |

Whether the above Table 3 is used or the above table 4 is used may be determined by a higher layer parameter. In the above Tables 3 and 4, $Q_m$ and $Q_m'$ are used to interpret differently according to a specific slot of a subframe to which a PDSCH is allocated ($Q_m$: in case of normal PDSCH, $Q_m'$: when the PDSCH is allocated only to a second slot).

TABLE 5

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

If the UE can support 64QAM in the PUSCH and is configured by a higher layer to transmit only QPSK and 16QAM, a modulation order is given as $Q_m'$ according to the above Table 5.

If the UE cannot support 64QAM in the PUSCH and is configured by the higher layer to transmit only QPSK and 16QAM, $Q_m'$ is read from the above Table 5. In this case, the modulation order is set to $Q_m = \min(4, Q_m')$.

In the above Table 5, a UL case is used to interpret differently according to whether 64QAM can be supported in the PUSCH based on UE capability ($Q_m$: when the UE cannot support 64QAM, $Q_m'$: when the UE can support 64QAM).

For the TBS index configured by the MCS table, according to 3GPP TS, the TBS is given by $I_{TBS}$ and $N_{PRB}$. Herein, $N_{PRB}$ denotes the number of PRBs. Therefore, in the TBS table, TBS values corresponding to 110 $N_{PRB}$ values are defined for each of 34 types of TBSs (dimension 34×110).

In addition, when spatial multiplexing is applied, according to $N_{PRB}$, the TBS becomes a multiple of the number of layers, or the TBS is determined according to a predetermined mapping rule.

The TBS and the determined number of PRBs may be defined differently depending on a system environment.

In the following table, a relation between CQI and spectral efficiency is described.

In LTE, there are 15 types of CQI values ranging from 1 to 15 (4 bits) and mapping between the CQI values and modulation schemes. A transport block size is defined as shown in the following two tables.

TABLE 6

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 7

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

The following operation is possible based on the above Tables 6 and 6. For example, if the number of REs that can be used for data transmission in practice in one PRB is 138, an MCS may be determined by a CQI index of the UE. According to the MCS index, the modulation order and the TBS are determined, and the entire resource space is defined by an RB count N_RB. Herein, the modulation order is defined as the number of bits that can be transferred using one symbol such as 2 in QPSK and 4 in 16QAM. Then, Code Rate=(TBS+CRC 24 bits)/(M-order*(REs/PRB)*N_RB). In addition, Spectral Efficiency=M-order*Code Rate. Examples thereof are as follows.

TABLE 8

| CQI | Modulation | Bits/Symbol | REs/PRB | N_RB | MCS | TBS | Code Rate | SE |
|---|---|---|---|---|---|---|---|---|
| 1 | QPSK | 2 | 138 | 20 | 0 | 536 | 0.101449 | 0.202898 |
| 2 | QPSK | 2 | 138 | 20 | 0 | 536 | 0.101449 | 0.202898 |
| 3 | QPSK | 2 | 138 | 20 | 2 | 872 | 0.162319 | 0.324638 |
| 4 | QPSK | 2 | 138 | 20 | 5 | 1736 | 0.318841 | 0.637682 |
| 5 | QPSK | 2 | 138 | 20 | 7 | 2417 | 0.442210 | 0.88442 |
| 6 | QPSK | 2 | 138 | 20 | 9 | 3112 | 0.568116 | 1.136232 |
| 7 | 16QAM | 4 | 138 | 20 | 12 | 4008 | 0.365217 | 1.460868 |
| 8 | 16QAM | 4 | 138 | 20 | 14 | 5160 | 0.469565 | 1.87826 |
| 9 | 16QAM | 4 | 138 | 20 | 16 | 6200 | 0.563768 | 2.255072 |
| 10 | 64QAM | 6 | 138 | 20 | 20 | 7992 | 0.484058 | 2.904348 |
| 11 | 64QAM | 6 | 138 | 20 | 23 | 9912 | 0.600000 | 3.6 |
| 12 | 64QAM | 6 | 138 | 20 | 25 | 11448 | 0.692754 | 4.156524 |
| 13 | 64QAM | 6 | 138 | 20 | 27 | 12576 | 0.760870 | 4.56522 |
| 14 | 64QAM | 6 | 138 | 20 | 28 | 14688 | 0.888406 | 5.330436 |
| 15 | 64QAM | 6 | 138 | 20 | 28 | 14688 | 0.888406 | 5.330436 |

In addition, a required signal to interference plus noise ratio (SINR) based on each CQI index may be defined as shown in the following table.

TABLE 9

| CQI index | Modulation | Spectral efficiency (bps/Hz) | Reference SINR (dB) |
|---|---|---|---|
| 0 | Out of range | | |
| 1 | QPSK | 0.15 | 6.7 |
| 2 | QPSK | 0.23 | -4.7 |
| 3 | QPSK | 0.38 | -2.3 |
| 4 | QPSK | 0.60 | 0.2 |
| 5 | QPSK | 0.88 | 2.4 |
| 6 | QPSK | 1.18 | 4.3 |
| 7 | 16-QAM | 1.48 | 5.9 |
| 8 | 16-QAM | 1.91 | 8.1 |
| 9 | 16-QAM | 2.41 | 10.3 |
| 10 | 64-QAM | 2.73 | 11.7 |
| 11 | 64-QAM | 3.32 | 14.1 |
| 12 | 64-QAM | 3.90 | 16.3 |
| 13 | 64-QAM | 4.52 | 18.7 |
| 14 | 64-QAM | 5.12 | 21.0 |
| 15 | 64-QAM | 5.55 | 22.7 |

$$MPR = \frac{1}{K_S}\log_2(1 + l \cdot SINR)$$

Multi-layer transmission of NoMA is not considered in the CQI table or MCS table for the existing MCS control. In addition, the CQI table or the MCS table may vary due to a change in a block error rate (BLER) characteristic for NoMA transmission.

The present specification proposes the MCS table and CQI table considering NoMA-based multi-layer transmission.

In a NoMA-based access scheme, a receiving side performs multi-layer reception based on an MA signature, and multi-layers can be distinguished by a procedure of the receiving side.

Figure 11:
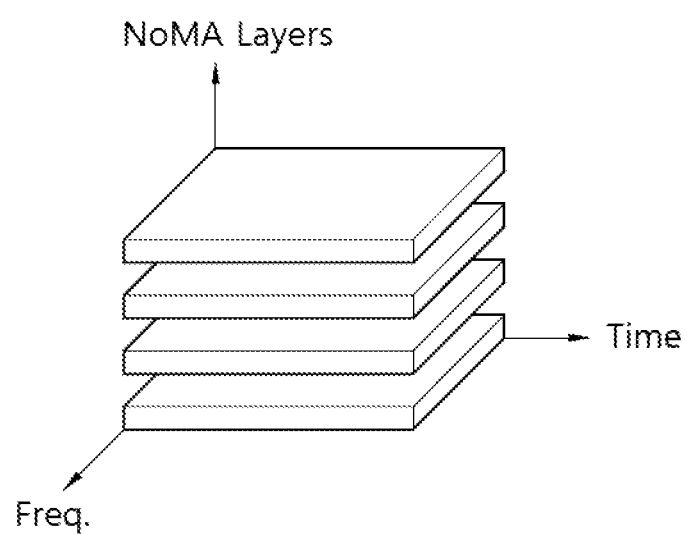
FIG. 11 shows a scheme in which the same time-frequency resource is distinguished by a NoMA layer in a NoMA-based access scheme.

FIG. 11 shows a scheme in which the same time-frequency resource is distinguished by a NoMA layer in a NoMA-based access scheme.

A layer may correspond to a path through which signals can be transmitted independently in time and frequency resources. Therefore, the layer may also be used in the same meaning as a stream. If a single UE supports a plurality of layers, the layers may be allocated to respective transmit antennas by being multiplied by a specific precoding matrix according to a channel state by means of a precoding module. Therefore, the layer may also mean an antenna layer. The present embodiment assumes a case where the single UE transmits/receives signals through the multi-layers.

For example, a NoMA scheme based on an MM-based encoder may use a codebook set as follows.

TABLE 10

| Codebook Index | Codebook $k = \dfrac{\begin{matrix}00 & 01 & 10 & 11\end{matrix}}{[vec\,1\ \ vec\,2\ \ vec\,3\ \ vec\,4]} * P_{no}$ |
|---|---|
| 1 | $\begin{bmatrix} 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ -3 & -1 & 1 & 3 \end{bmatrix} * P_{no}$ |
| 2 | $\begin{bmatrix} -3 & -1 & 1 & 3 \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \end{bmatrix} * P_{no}$ |
| 3 | $\begin{bmatrix} -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & 0 \\ 0 & 0 & 0 & 0 \end{bmatrix} * P_{no}$ |
| 4 | $\begin{bmatrix} 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \end{bmatrix} * P_{no}$ |
| 5 | $\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \end{bmatrix} * P_{no}$ |

TABLE 10-continued

| Codebook Index | Codebook $k = \dfrac{\begin{matrix}00 & 01 & 10 & 11\end{matrix}}{[vec\,1\ \ vec\,2\ \ vec\,3\ \ vec\,4]} * P_{no}$ |
|---|---|
| 6 | $\begin{bmatrix} 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & 0 \end{bmatrix} * P_{no}$ |

Herein, $P_{no}$ is an (M×M) normalized matrix for power constrains. $P_{no}$ is expressed by the following equation.

TABLE 10

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

Herein, $P_{no,m}=(1/|vec\,m|)\times\sqrt{K}$, for m=1, ..., M, where K=4, M=4.

The above example shows a case where a spreading factor K is 2 and modulation has 4 constellations (M=4) which are the same as those of QPSK. In this case, M-order is defined as log 2(M)=2. In addition, it is defined that the total number of codebooks is J=6, and an overloading factor is J/K=150%. That is, there are 6 layers which share the same physical resources, and the receiving side may perform data detection/decoding by distinguishing 6 layers.

As a first embodiment, when the relation between the MCS table and the spectral efficiency is arithmetically created based on the above example and the above Table 3, the spectral efficiency may be configured as shown in the below Table 11 (In the following example, it is assumed that there are 138 REs capable of transmitting data in one PRB. The number of REs capable of transmitting data may vary depending on reference signal (RS) density or the like. In this case, encoding and decoding are possible through rate matching. The entire content described in the present specification relates to only the content related to the modulation order $Q_m$. It is obvious that the content corresponding to $Q_m'$ can be defined and calculated in the same calculation manner).

TABLE 11

| | | | | Spectral Efficiency via Multi-Layer of NoMA | | | | | |
|---|---|---|---|---|---|---|---|---|---|
| MCS Index $I_{MCS}$ | Modulation order $Q_m$ | TBS Index $I_{TBS}$ | TBS for $N_{PRB}=1$ | Coderate | # of Layer = 1, TBS' = TBS * 1 | # of Layer = 2, TBS' = TBS * 2 | # of Layer = 3, TBS' = TBS * 3 | # of Layer = 4, TBS' = TBS * 4 | # of Layer = 5, TBS' = TBS * 5 | # of Layer = 6, TBS' = TBS * 6 |
| 0 | 2 | 0 | 16 | 0.144928 | 0.289855072 | 0.579710145 | 0.869565217 | 1.15942029 | 1.449275362 | 1.73910435 |
| 1 | 2 | 1 | 24 | 0.173913 | 0.347826087 | 0.695652174 | 1.043478261 | 1.391304348 | 1.739130435 | 2.086956522 |
| 2 | 2 | 2 | 32 | 0.202899 | 0.405797101 | 0.811594203 | 1.217391304 | 1.623188406 | 2.028985507 | 2.434782609 |
| 3 | 2 | 3 | 40 | 0.231884 | 0.463768116 | 0.927536232 | 1.391304348 | 1.855072464 | 2.31884058 | 2.782608696 |
| 4 | 2 | 4 | 56 | 0.289855 | 0.579710145 | 1.15942029 | 1.739130435 | 2.31884058 | 2.898550725 | 3.47826087 |
| 5 | 2 | 5 | 72 | 0.347826 | 0.695652174 | 1.391304348 | 2.086956522 | 2.782608696 | 3.47826087 | 4.173913043 |
| 6 | 2 | 6 | 328 | — | — | — | — | — | — | — |
| 7 | 2 | 7 | 104 | 0.463768 | 0.927536232 | 1.855072464 | 2.782608696 | 3.710144928 | 4.637681159 | 5.565217391 |
| 8 | 2 | 8 | 120 | 0.521739 | 1.043478261 | 2.086956522 | 3.130434783 | 4.173913043 | 4.637681159 | 6.260869565 |
| 9 | 2 | 9 | 136 | 0.57971 | 1.15942029 | 2.31884058 | 3.47826087 | 4.637681159 | 4.869565217 | 6.95621739 |
| 10 | 4 | 9 | 136 | 0.289855 | 1.15942029 | 2.31884058 | 3.47826087 | 4.637681159 | 5.797101449 | 6.95621739 |
| 11 | 4 | 10 | 144 | 0.304348 | 1.217391304 | 2.434782609 | 3.652173913 | 4.869565217 | 6.086956522 | 7.304347826 |
| 12 | 4 | 11 | 176 | 0.362319 | 1.449275362 | 2.898550725 | 4.347826087 | 5.787101449 | 7.246376812 | 8.695652174 |
| 13 | 4 | 12 | 208 | 0.42029 | 1.68115942 | 3.362318841 | 5.043478261 | 6.724637681 | 8.405797101 | 10.08695652 |
| 14 | 4 | 13 | 224 | 0.449275 | 1.797101449 | 3.594202899 | 5.391304348 | 7.188405797 | 8.985507246 | 10.7826087 |

TABLE 11-continued

| | | | | | Spectral Efficiency via Multi-Layer of NoMA | | | | | |
|---|---|---|---|---|---|---|---|---|---|---|
| MCS Index $I_{MCS}$ | Modulation order $Q_m$ | TBS Index $I_{TBS}$ | TBS for $N_{PRB} = 1$ | Coderate | # of Layer = 1, TBS' = TBS * 1 | # of Layer = 2, TBS' = TBS * 2 | # of Layer = 3, TBS' = TBS * 3 | # of Layer = 4, TBS' = TBS * 4 | # of Layer = 5, TBS' = TBS * 5 | # of Layer = 6, TBS' = TBS * 6 |
| 15 | 4 | 14 | 256 | 0.507246 | 2.028985507 | 4.057971014 | 6.086956522 | 8.115942029 | 10.14492754 | 12.17391304 |
| 16 | 4 | 15 | 280 | 0.550725 | 2.202898551 | 4.405797101 | 6.086956522 | 8.811594203 | 11.01449275 | 13.2173913 |
| 17 | 6 | 15 | 280 | 0.36715 | 2.202898551 | 4.405797101 | 6.086956522 | 8.811594203 | 11.01449275 | 13.2173913 |
| 18 | 6 | 16 | 328 | 0.425121 | 2.550724638 | 5.101449275 | 7.652173913 | 10.20289855 | 12.75362319 | 15.30434783 |
| 19 | 6 | 17 | 336 | 0.434783 | 2.260869565 | 5.217391304 | 7.826086957 | 10.43478261 | 13.04347826 | 15.65217391 |
| 20 | 6 | 18 | 376 | 0.483092 | 2.898550725 | 5.797101449 | 8.695652174 | 11.5942029 | 14.49275362 | 17.39130435 |
| 21 | 6 | 19 | 408 | 0.521739 | 3.130434783 | 6.260869565 | 9.391304348 | 12.52173913 | 15.65217391 | 18.7826087 |
| 22 | 6 | 20 | 440 | 0.560386 | 3.362318841 | 6.724637681 | 10.08695652 | 13.44927536 | 16.8115942 | 20.17391304 |
| 23 | 6 | 21 | 488 | 0.618357 | 3.710144928 | 7.420289855 | 11.13043478 | 14.84057971 | 18.55072464 | 22.26086957 |
| 24 | 6 | 22 | 520 | 0.657005 | 3.942028986 | 7.884057971 | 11.82608696 | 15.76811594 | 19.71014493 | 23.65217391 |
| 25 | 6 | 23 | 552 | 0.695652 | 4.173913043 | 8.347826087 | 12.52173913 | 16.69565217 | 20.86956522 | 25.04347826 |
| 26 | 6 | 24 | 584 | 0.7343 | 4.405797101 | 8.811594203 | 13.2173913 | 17.62318841 | 22.02898551 | 26.43478261 |
| 27 | 6 | 25 | 616 | 0.772947 | 4.637681159 | 9.275362319 | 13.91304348 | 18.55072464 | 23.1884058 | 27.82608696 |
| 28 | 6 | 26 | 712 | 0.888889 | 5.333333333 | 10.66666667 | 16 | 21.33333333 | 26.66366667 | 32 |
| 28 | 6 | 26A | 632 | 0.792271 | 4.753623188 | 9.507246377 | 14.26086957 | 19.01449275 | 23.76811594 | 28.52173913 |
| 29 | 2 | | | | reserved | | | | | |
| 30 | 4 | | | | | | | | | |
| 31 | 6 | | | | | | | | | |

In the above Table 11, a case were MCS Index=6 (TBS Index=6) and $N_{PRB}=1$ is a case where TTI bundling (two subframes) is applied for VoIP, and this case will be excluded in the description of the present embodiment. In addition, it is assumed that maximum capacity is 5.3333 from a perspective of a single UE (this is already assumed to configure MCS in a meaningful required SINR region. For example, when considering a high modulation scheme such as 256QAM or 1024QAM or the like, an MCS configuration of the single UE may vary, and a maximum SE value in this case may be greater than 5.3). According to the above Table 8, when a required SINR based on a CQI index is good, an expected maximum SE is about 5.3. Since a maximum SE greater than or equal to 5.3 is not guaranteed, an SE value which is not bolded in the above Table 11 is a meaningless value.

As exemplified above, a configuration of spectral efficiency that can be achieved based on the MCS table and a multi-layer of NoMA may be determined only with a spectral efficiency (SE) value which is bolded in the above Table 11. However, a NoMA scheme based on an MM based encoder needs to have a different codebook set according to an M-order. Accordingly, when codebook set corresponding to an M-order 2 is used in the aforementioned example, only spectral efficiency that uses at least one layer corresponding to the M-order 2 can be achieved among spectral efficiency which is bolded in the above Table 11.

A NoMA MCS index corresponding to the M-order 2 in the above Table 11 ranges from 0 to 9. When the NoMA MCS index is greater than or equal to 10, a new codebook set based on new M-order shall b configured.

As a second embodiment, when the relation between the MCS table and the spectral efficiency is arithmetically created based on the above Table 4 in the same manner, the spectral efficiency may be configured as shown in the below Table 12 (In the following example, it is assumed that there are 138 REs capable of transmitting data in one PRB).

TABLE 12

| | | | | | Spectral Efficiency via Multi-Layer of NoMA | | | | | |
|---|---|---|---|---|---|---|---|---|---|---|
| MCS Index $I_{MCS}$ | Modulation order $Q_m$ | TBS Index $I_{TBS}$ | TBS for $N_{PRB} = 1$ | Coderate | # of Layer = 1, TBS' = TBS * 1 | # of Layer = 2, TBS' = TBS * 2 | # of Layer = 3, TBS' = TBS * 3 | # of Layer = 4, TBS' = TBS * 4 | # of Layer = 5, TBS' = TBS * 5 | # of Layer = 6, TBS' = TBS * 6 |
| 0 | 2 | 0 | 16 | 0.144928 | 0.289855072 | 0.579710145 | 0.869565217 | 1.15942029 | 1.449275362 | 1.73910435 |
| 1 | 2 | 2 | 32 | 0.202899 | 0.405797101 | 0.811594203 | 1.217391304 | 1.623188406 | 2.028985507 | 2.434782609 |
| 2 | 2 | 4 | 56 | 0.289855 | 0.579710145 | 1.15942029 | 1.739130435 | 2.31884058 | 2.898550725 | 3.47826087 |
| 3 | 2 | 6 | 328 | — | — | — | — | — | — | — |
| 4 | 2 | 8 | 120 | 0.521739 | 1.043478261 | 2.086956522 | 3.130434783 | 4.1739133043 | 5.217391304 | 6.260869565 |
| 5 | 4 | 10 | 144 | 0.304348 | 1.217391304 | 2.434782609 | 3.652173913 | 4.869565217 | 6.086956522 | 7.304347826 |
| 6 | 4 | 11 | 176 | 0.362319 | 1.449275362 | 2.898550725 | 4.347826087 | 5.787101449 | 7.246376812 | 8.695652174 |
| 7 | 4 | 12 | 208 | 0.42029 | 1.68115942 | 3.362318841 | 5.043478261 | 6.724637681 | 8.405797101 | 10.08695652 |
| 8 | 4 | 13 | 224 | 0.449275 | 1.797101449 | 3.594202899 | 5.391304348 | 7.188405797 | 8.985507246 | 10.7826087 |
| 9 | 4 | 14 | 256 | 0.507246 | 2.028985507 | 4.057971014 | 6.086956522 | 8.115942029 | 10.14492754 | 12.17391304 |
| 10 | 4 | 15 | 280 | 0.550725 | 2.202898551 | 4.405797101 | 6.608695652 | 8.811594203 | 11.01449275 | 13.2173913 |
| 11 | 6 | 16 | 328 | 0.425121 | 2.550724638 | 5.101449275 | 7.652173913 | 10.20289855 | 12.75362319 | 15.30434783 |
| 12 | 6 | 17 | 336 | 0.434783 | 2.608695652 | 5.217391304 | 7.826086957 | 10.43478261 | 13.04347826 | 15.65217391 |
| 13 | 6 | 18 | 376 | 0.483092 | 2.898550725 | 5.797101449 | 8.695652174 | 11.5942029 | 14.49275362 | 17.39130435 |
| 14 | 6 | 19 | 408 | 0.521739 | 3.130434783 | 6.260869565 | 9.391304348 | 12.52173913 | 15.65217391 | 18.7826087 |
| 15 | 6 | 20 | 440 | 0.560386 | 3.362318841 | 6.724637681 | 10.08695652 | 13.44927536 | 16.8115942 | 20.17391304 |

TABLE 12-continued

| MCS Index $I_{MCS}$ | Modulation order $Q_m$ | TBS Index $I_{TBS}$ | TBS for $N_{PRB}=1$ | Coderate | Spectral Efficiency via Multi-Layer of NoMA | | | | | |
|---|---|---|---|---|---|---|---|---|---|---|
| | | | | | # of Layer = 1, TBS' = TBS * 1 | # of Layer = 2, TBS' = TBS * 2 | # of Layer = 3, TBS' = TBS * 3 | # of Layer = 4, TBS' = TBS * 4 | # of Layer = 5, TBS' = TBS * 5 | # of Layer = 6, TBS' = TBS * 6 |
| 16 | 6 | 21 | 488 | 0.618357 | 3.710144928 | 7.420289855 | 11.13043478 | 14.84057971 | 18.55072464 | 22.26086957 |
| 17 | 6 | 22 | 520 | 0.657005 | 3.942028986 | 7.884057971 | 11.82608696 | 15.76811594 | 19.71014493 | 23.65217391 |
| 18 | 6 | 23 | 552 | 0.695652 | 4.173913043 | 8.347826087 | 12.52173913 | 16.69565217 | 20.86956522 | 25.04347826 |
| 19 | 6 | 24 | 584 | 0.7343 | 4.405797101 | 8.811594203 | 13.2173913 | 17.62318841 | 22.02898551 | 26.43478261 |
| 20 | 8 | 25 | 616 | 0.57971 | 4.637681159 | 9.275362319 | 13.91304348 | 18.55072464 | 23.1884058 | 27.82608696 |
| 21 | 8 | 27 | 648 | 0.608696 | 4.869565217 | 9.739130435 | 14.60869565 | 19.47826087 | 24.34782609 | 29.2173913 |
| 22 | 8 | 28 | 680 | 0.637681 | 5.101449275 | 10.20289855 | 15.30434783 | 20.4057971 | 25.50724638 | 30.6089565 |
| 23 | 8 | 29 | 712 | 0.666667 | 5.3333333333 | 10.66666667 | 16 | 21.3333333 | 26.66666667 | 32 |
| 24 | 8 | 30 | 776 | 0.724638 | 5.797101449 | 11.5942029 | 17.39130435 | 23.1884058 | 28.98550725 | 34.7826087 |
| 25 | 8 | 31 | 808 | 0.753623 | 6.028985507 | 12.05797101 | 18.08695652 | 24.11594203 | 30.14492754 | 36.17391304 |
| 26 | 8 | 32 | 840 | 0.782609 | 6.260869565 | 12.52173913 | 18.7826087 | 25.04347826 | 31.30434783 | 37.56521739 |
| 27 | 8 | 33 | 968 | 0.898551 | 7.188405797 | 14.37681159 | 21.56521739 | 28.75362319 | 35.94202899 | 43.13043478 |
| 27 | 8 | 33A | 840 | 0.782609 | 6.260869565 | 12.52173913 | 18.7826087 | 25.04347826 | 31.30434783 | 37.56521739 |
| 28 | 2 | | | | reserved | | | | | |
| 29 | 4 | | | | | | | | | |
| 30 | 6 | | | | | | | | | |
| 31 | 8 | | | | | | | | | |

In the above Table 12, a case where MCS Index=3 (TBS Index=6) and N_PRB=1 is a case where TTI bundling (two subframes) is applied for VoIP, and this case will be excluded in the description of the present embodiment. In addition, it is assumed that maximum capacity is 7.2 from a perspective of a single UE (this is already assumed to configure MCS in a meaningful required SINR region).

As exemplified above, a configuration of spectral efficiency that can be achieved based on the MCS table and a multi-layer of NoMA may be determined only with a spectral efficiency (SE) value which is bolded in the above Table 12. However, a NoMA scheme based on an MM based encoder needs to have a different codebook set according to an M-order. Accordingly, when a codebook set corresponding to an M-order 2 is used in the aforementioned example, only spectral efficiency that uses at least one layer corresponding to the M-order 2 can be achieved among spectral efficiency which is bolded in the above Table 12.

Scheme 1. NoMA MCS

The present specification proposes a scheme of configuring an MCS table by using a plurality of NoMA layers by a single user based on the aforementioned characteristic. That is, for the example of the above Table 11 and Table 12, a NoMA MCS table may be newly defined based on a relation between a NoMA layer and an MCS table that can achieve spectral efficiency corresponding to the M-order 2 among spectral efficiency which is bolded in the above Table 11 and Table 12. For example, the NoMA MCS may be defined as shown in the below Table 13. In Table 13, as expressed in the first embodiment, a case of using a codebook set corresponding to the M-order 2 is shown under the assumption that 138 REs can transmit data in one PRB based on the above Table 3.

TABLE 13

| NoMA MCS Index $I_{MCS}$ | Modulation Order $Q_{in}$ | TBS Index $I_{TBS}$ | Code rate | # of NoMA Layers | TBS of a NoMA Layer for $N_{PRB}=1$ | NoMA_TBS (= TBS*# of Layer) | Spectral Efficiency via Multi-Layer of NoMA |
|---|---|---|---|---|---|---|---|
| 0 | 2 | 0 | 0.1449275 | 1 | 16 | 16 | 0.289855072 |
| 1 | 2 | 0 | 0.1449275 | 2 | 16 | 32 | 0.579710145 |
| 2 | 2 | 0 | 0.1449275 | 3 | 16 | 48 | 0.869565217 |
| 3 | 2 | 0 | 0.1449275 | 4 | 16 | 64 | 1.15942029 |
| 4 | 2 | 0 | 0.1449275 | 5 | 16 | 80 | 1.449275362 |
| 5 | 2 | 0 | 0.1449275 | 6 | 16 | 96 | 1.739130435 |
| 6 | 2 | 1 | 0.173913 | 1 | 24 | 24 | 0.347826087 |
| 7 | 2 | 1 | 0.173913 | 2 | 24 | 48 | 0.695652174 |
| 8 | 2 | 1 | 0.173913 | 3 | 24 | 72 | 1.043478261 |
| 9 | 2 | 1 | 0.173913 | 4 | 24 | 96 | 1.391304348 |
| 10 | 2 | 1 | 0.173913 | 5 | 24 | 120 | 1.739130435 |
| 11 | 2 | 1 | 0.173913 | 6 | 24 | 144 | 2.086956522 |
| 12 | 2 | 2 | 0.2028986 | 1 | 32 | 32 | 0.405797101 |
| 13 | 2 | 2 | 0.2028986 | 2 | 32 | 64 | 0.811594203 |
| 14 | 2 | 2 | 0.2028986 | 3 | 32 | 96 | 1.217391304 |
| 15 | 2 | 2 | 0.2028986 | 4 | 32 | 128 | 1.623188406 |
| 16 | 2 | 2 | 0.2028986 | 5 | 32 | 160 | 2.028985507 |
| 17 | 2 | 2 | 0.2028986 | 6 | 32 | 192 | 2.434782609 |
| 18 | 2 | 3 | 0.2318841 | 1 | 40 | 40 | 0.463768116 |
| 19 | 2 | 3 | 0.2318841 | 2 | 40 | 80 | 0.927536232 |
| 20 | 2 | 3 | 0.2318841 | 3 | 40 | 120 | 1.391304348 |
| 21 | 2 | 3 | 0.2318841 | 4 | 40 | 160 | 1.855072464 |
| 22 | 2 | 3 | 0.2318841 | 5 | 40 | 200 | 2.31884058 |
| 23 | 2 | 3 | 0.2318841 | 6 | 40 | 240 | 2.782608696 |

TABLE 13-continued

| NoMA MCS Index $I_{MCS}$ | Modulation Order $Q_{in}$ | TBS Index $I_{TBS}$ | Code rate | # of NoMA Layers | TBS of a NoMA Layer for $N_{PRB} = 1$ | NoMA_TBS (= TBS*# of Layer) | Spectral Efficiency via Multi-Layer of NoMA |
|---|---|---|---|---|---|---|---|
| 24 | 2 | 4 | 0.2898551 | 1 | 56 | 56 | 0.579710145 |
| 25 | 2 | 4 | 0.2898551 | 2 | 56 | 112 | 1.15942029 |
| 26 | 2 | 4 | 0.2898551 | 3 | 56 | 168 | 1.739130435 |
| 27 | 2 | 4 | 0.2898551 | 4 | 56 | 224 | 2.31884058 |
| 28 | 2 | 4 | 0.2898551 | 5 | 56 | 280 | 2.898550725 |
| 29 | 2 | 4 | 0.2898551 | 6 | 56 | 336 | 3.47826087 |
| 30 | 2 | 5 | 0.3478261 | 1 | 72 | 72 | 0.695652174 |
| 31 | 2 | 5 | 0.3478261 | 2 | 72 | 144 | 1.391304348 |
| 32 | 2 | 5 | 0.3478261 | 3 | 72 | 216 | 2.086956522 |
| 33 | 2 | 5 | 0.3478261 | 4 | 72 | 288 | 2.782608696 |
| 34 | 2 | 5 | 0.3478261 | 5 | 72 | 360 | 3.47826087 |
| 35 | 2 | 5 | 0.3478261 | 6 | 72 | 432 | 4.173913043 |
| 36 | 2 | 7 | 0.4637681 | 1 | 104 | 104 | 0.927536232 |
| 37 | 2 | 7 | 0.4637681 | 2 | 104 | 208 | 1.855072464 |
| 38 | 2 | 7 | 0.4637681 | 3 | 104 | 312 | 2.782608696 |
| 39 | 2 | 7 | 0.4637681 | 4 | 104 | 416 | 3.710144928 |
| 40 | 2 | 7 | 0.4637681 | 5 | 104 | 520 | 4.637681159 |
| 41 | 2 | 8 | 0.5217391 | 1 | 120 | 120 | 1.043478261 |
| 42 | 2 | 8 | 0.5217391 | 2 | 120 | 240 | 2.086956522 |
| 43 | 2 | 8 | 0.5217391 | 3 | 120 | 360 | 3.130434783 |
| 44 | 2 | 8 | 0.5217391 | 4 | 120 | 480 | 4.173913043 |
| 45 | 2 | 8 | 0.5217391 | 5 | 120 | 600 | 5.217391304 |
| 46 | 2 | 9 | 0.5797101 | 1 | 136 | 136 | 1.15942029 |
| 47 | 2 | 9 | 0.5797101 | 2 | 136 | 272 | 2.31884058 |
| 48 | 2 | 9 | 0.5797101 | 3 | 136 | 408 | 3.47826087 |
| 49 | 2 | 9 | 0.5797101 | 4 | 136 | 544 | 4.637681159 |

According to the above Table 13, it can be seen that the number of NoMA MC indices increases from 32 to 49, compared to the above Table 11 and Table 12. In addition, the number of NoMA layers that can be supported for a specific TBS index may range from 1 to 6. However, since it is assumed that maximum capacity is 5.3333 from a perspective of a single UE, the number of NoMA layers of which SE exceeds 5.3333 is not described. For example, if the TBS index is 7 and the number of NoMA layers is 6, since the SE exceeds UE capacity, a corresponding embodiment is excluded from the above Table 13.

The NoMA MCS for the codebook set related to the modulation order 2 can be defined through the aforementioned scheme, thereby providing a variety of spectral efficiency from a perspective of a single user. That is, the NoMA MCS may be configured of a modulation order, a coderate, a TBS, and the number of NoMA layers (# of NoMA layers). In this case, since the NoMA technique based on the MM based encoder may have a different codebook set depending on a modulation order, a NoMA MCS table may be different for each modulation order.

For convenience of explanations in the above example, a TBS for multi-layers is expressed as (TBS of single NoMA layer)*(# of layers) with respect to the NoMA MCS. In practice, however, when only one CRC exists in the plurality of-layers, the TBS may differ for the multi-layers. In this case, there may be a difference in a spectral efficiency value due to a change in the code rate and a change in the TBS.

Although the above Table 13 exemplifies the NoMA MCS based on the above Table 3, it is obviously also applicable to the above Table 4 in a similar manner. Alternatively, it is newly defined obviously irrespective of the existing legacy modulation and TBS index. The newly defined modulation index and TBS index may also be configured to a modulation order, a TBS, and # of NoMA layers.

Although the above Table 13 exemplifies only for a case of the modulation order 2, it is obviously also applicable to each of different modulation orders in a similar manner. In addition, NoMA MCS for various modulation orders may also be defined as one NoMA MCS table. For example, a NoMA MCS table may be configured for each modulation order with the same structure as shown in the below Table 14.

TABLE 14

| NoMA MCS Index $I_{MCS}$ | Modulation Order $Q_{in}$ | TBS Index $I_{TBS}$ | Coderate | # of NoMA Layers | TBS of a NoMA Layer for $N_{PRB} = 1$ | NoMA_TBS (= TBS*# of Layer) | Spectral Efficiency via Multi-Layer of NoMA | NoMA Codebook Set Index |
|---|---|---|---|---|---|---|---|---|
| 0 | 2 | 0 | 0.1449275 | 1 | 16 | 16 | 0.289855072 | 1 |
| 1 | 2 | 0 | 0.1449275 | 2 | 16 | 32 | 0.579710145 | 1 |
| 2 | 2 | 0 | 0.1449275 | 3 | 16 | 48 | 0.869565217 | 1 |
| ... | ... | ... | ... | ... | ... | ... | ... | ... |
| 47 | 2 | 9 | 0.5797101 | 2 | 136 | 272 | 2.31884058 | 1 |
| 48 | 2 | 9 | 0.5797101 | 3 | 136 | 408 | 3.47826087 | 1 |
| 49 | 2 | 9 | 0.5797101 | 4 | 136 | 544 | 4.637681159 | 1 |
| 50 | 4 | 9 | 0.289855 | 1 | 136 | 136 | 1.15942029 | 2 |
| 51 | 4 | 10 | 0.304348 | 2 | 144 | 288 | 2.31884058 | 2 |
| ... | ... | ... | ... | ... | ... | ... | ... | ... |

TABLE 14-continued

| NoMA MCS Index $I_{MCS}$ | Modulation Order $Q_{in}$ | TBS Index $I_{TBS}$ | Coderate | # of NoMA Layers | TBS of a NoMA Layer for $N_{PRB} = 1$ | NoMA_TBS (= TBS*# of Layer) | Spectral Efficiency via Multi-Layer of NoMA | NoMA Codebook Set Index |
|---|---|---|---|---|---|---|---|---|
| 70 | 6 | 16 | 0.425121 | 1 | 328 | 328 | 2.550724638 | 3 |
| 71 | 6 | 16 | 0.425121 | 2 | 328 | 656 | 5.101449275 | 3 |
| ... | ... | ... | ... | ... | ... | ... | ... | ... |

In the above Table 14, the content of NoMA MCS indices 0 to 49 directly includes the content of the above Table 13. In case of the above Table 14, a codebook set index based on a NoMA MCS index may be tied. According to the above Table 14, the NoMA MCS indices 0 to 49 may be tied to a NoMA codebook set index 1 based on the modulation order 2. The NoMA MCS indices 50 to 69 may be tied to a NoMA codebook set index 2 based on a modulation order 4. The NoMA MCS index greater than or equal to 70 may be tied to a NoMA codebook set index 3.

A BS and a UE may agree with each other for NoMA codebook sets based on the NoMA MCS index in a pre-defined or RRC signaling manner. Accordingly, when the NoMA MCS index is signaled from the BS, the UE may recognize a NoMA codebook set to be used. In this case, the UE shall recognize a UE specific NoMA codebook to be used by the number of NoMA layers based on the NoMA MCS index within the NoMA codebook set to be used. The UE specific codebook may be signaled by the BS or may be recognized by a scheme 3 described below.

Scheme 2. NoMA MCS and NoMA CQI based DL/UL procedure

Figure 12:
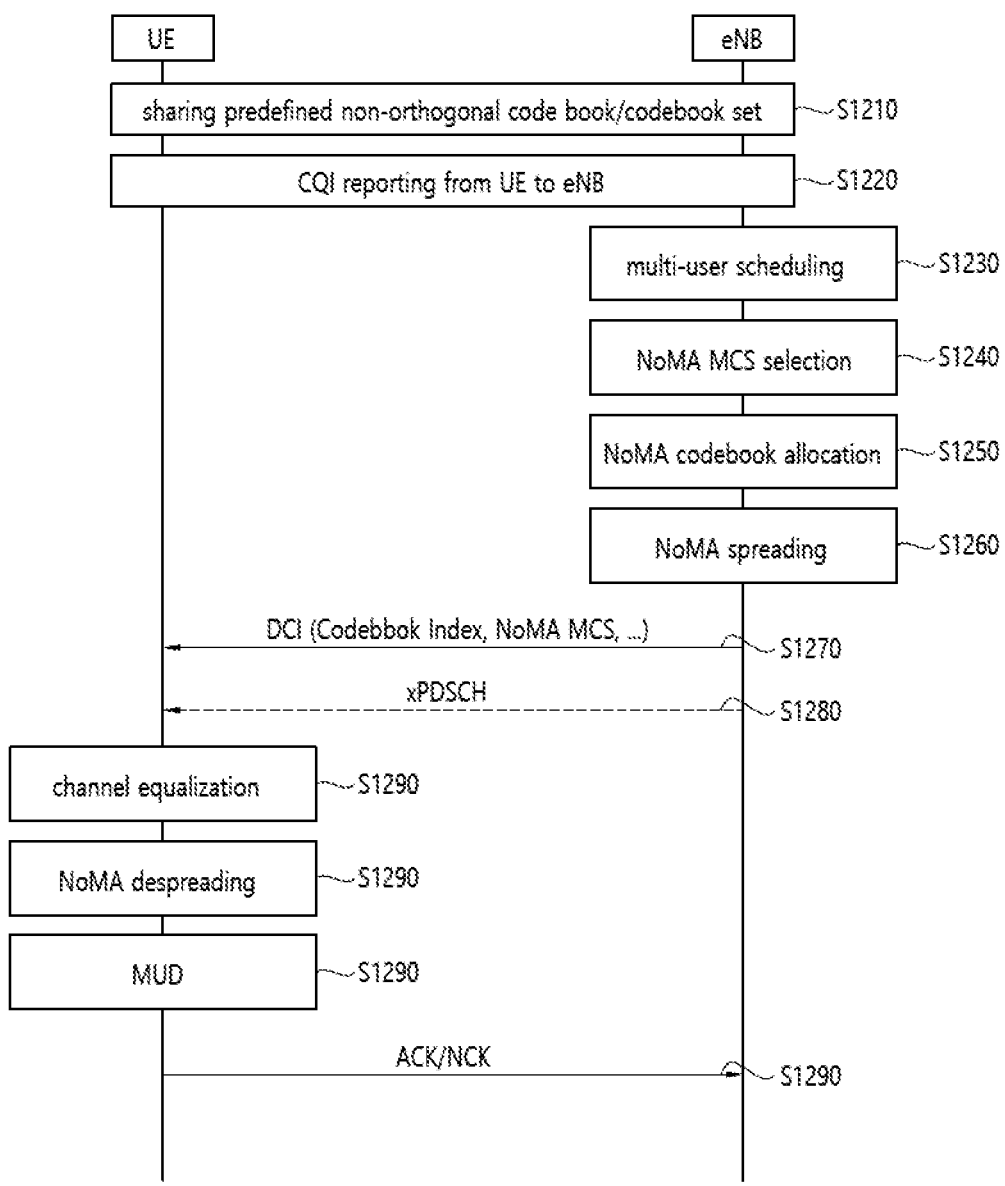
FIG. 12 shows a procedure of transmitting/receiving a signal of a DL NoMA system based on a NoMA MCS.
Figure 13:
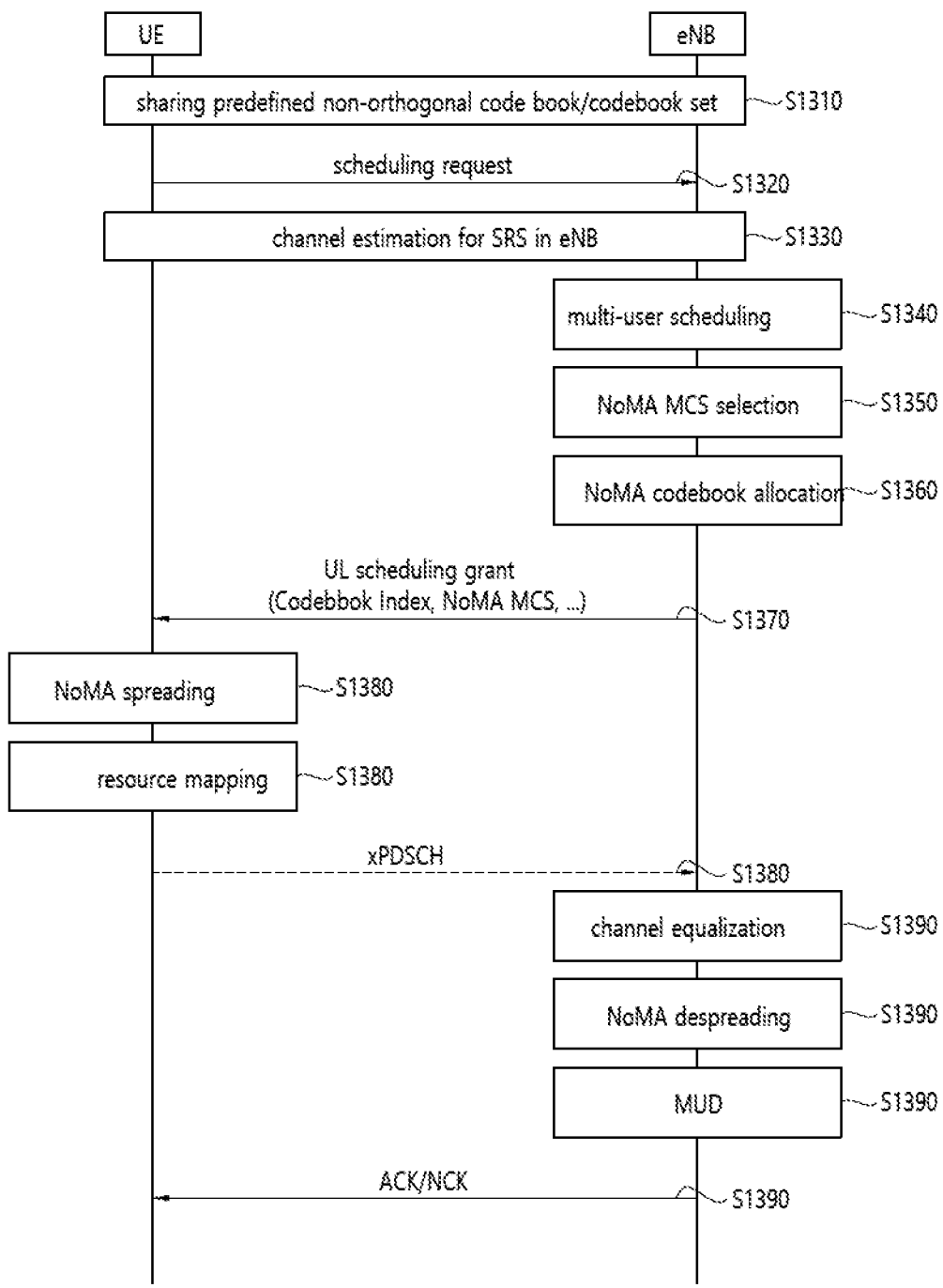
FIG. 13 shows a procedure of transmitting/receiving a signal in an uplink NoMA system according to a NoMA MCS.

A DL/UL procedure as shown in FIG. 12 and FIG. 13 may be defined based on the aforementioned NoMA MCS.

FIG. 12 shows a procedure of transmitting/receiving a signal of a DL NoMA system based on a NoMA MCS.

Referring to FIG. 12, a UE performs CQI reporting to perform a DL channel feedback thereof (S1220) (In this case, in an environment where channel reciprocity is guaranteed, channel quality may be estimated based on a UL signal such as SRS of the UE). An eNB performs fairness scheduling based on CQI reporting (S1230), and upon performing scheduling, performs selecting on NoMA MCS proposed in the scheme 1 for DL of each user (S1240). A NoMA layer is determined based on the NoMA MCS, and a NoMA codebook corresponding to the determined number of layers is selected from a NoMA codebook set (S1250). NoMA spreading is performed on each NoMA layer based on the selected NoMA codebook (S1260), and DL data is transmitted through xPDSCH (S1280). In this case, DCI information is transmitted through a DL control channel (e.g., PDCCH), and the DCI information transfers control information for DL data decoding, such as NoMA codebook index, NoMA MCS index, or the like (S1270). The UE decodes data through NoMA despreading and MUD based on the received DCI information (S1290).

In the procedure of transferring the signal, the codebook index may not be signaled according to a look-up table for a codebook configuration based on a predefined pattern/UE specific pattern or the like. This will be described in detail in the scheme 3 described below.

FIG. 13 shows a procedure of transmitting/receiving a signal in an uplink NoMA system according to a NoMA MCS.

Referring to FIG. 13, based on a UL signal such as SRS or the like of a user (S1320), an eNB recognizes UL channel quality (S1330) (In this case, channel quality may be estimated based on a DL signal state such as CQI reporting or the like for a DL channel in an environment where channel reciprocity is guaranteed). The eNB performs fairness scheduling based on the quality of the UL channel (S1340), and upon performing scheduling, performs selecting on NoMA MCS proposed in the scheme 1 for UL of each user (S1350). A NoMA layer is determined based on the NoMA MCS, and a NoMA codebook corresponding to the determined number of layers is selected from a NoMA codebook set (S1360). The selected NoMA codebook index and NoMA MCS index are signaled to the user by using a UL grant (S1370). The UE selects the NoMA codebook from the NoMA codebook set based on the received UL grant, configures the UL grant based on the NoMA MCS, and performs NoMA spreading on each NoMA layer to transmit UL data through xPUSCH (S1380). The eNB decodes the data through NoMA despreading and MUD based on the transmitted UL grant information (S1390).

In the procedure of transferring the signal, the codebook index may not be signaled according to a look-up table for a codebook configuration based on a predefined pattern/UE specific pattern or the like. This will be described in detail in the scheme 3 described below.

Scheme 3. Codebook index allocation method based on NoMA MCS

A method of exchanging a codebook index may be pre-defined by using a UE-ID or a predefined pattern.

According to the number of layers allocated based on MCS NoMA, the NoMA codebook to be used by a user may be allocated in a UE specific manner.

A UE specific NoMA codebook based on NoMA MCS may be a predefined pattern. For example, according to each NoMA MCS index as described below, a codebook index to be used based on the number of NoMA layers in a UE specific form may be defined as a pattern. The following example is a case where the maximum number of NoMA layers and the maximum number of codebook indices is 6. Herein, the codebook index is expressed as 0, . . . , 5.

TABLE 15

| NoMA MCS Index $I_{MCS}$ | # of NoMA Layers | Codebook Index | | | |
|---|---|---|---|---|---|
| | | UE 1 | UE 2 | ... | UE K |
| 0 | 1 | 0 | 1 | ... | 5 |
| 1 | 2 | 0, 1 | 2, 3 | ... | 4, 5 |
| 2 | 3 | 0, 1, 2 | 3, 4, 5 | ... | 3, 4, 5 |
| 3 | 4 | 0, 1, 3, 4 | 1, 2, 3, 4 | ... | 2, 3, 4, 5 |
| 4 | 5 | 1, 2, 3, 4, 5 | 0, 2, 3, 4, 5 | ... | 0, 1, 2, 3, 4 |
| 5 | 6 | 0, 1, 2, 3, 4, 5 | 0, 1, 2, 3, 4, 5 | ... | 0, 1, 2, 3, 4, 5 |
| 6 | 1 | 1 | 2 | ... | 0 |
| ... | ... | ... | ... | ... | ... |
| 46 | 1 | 5 | 0 | ... | 4 |
| 47 | 2 | 4, 5 | 0, 1 | ... | 2, 3 |
| 48 | 3 | 3, 4, 5 | 0, 1, 2 | ... | 2, 3, 4 |
| 49 | 4 | 2, 3, 4, 5 | 0, 1, 3, 4 | ... | 0, 1, 2, 3 |

Referring to the above Table 15, for example, if the NoMA MCS index is 0, the number of NoMA layers that can be supported by each UE is 1, and a pattern may be defined in which each UE shares the NoMA layers one by one. For another example, if the NoMA MCS index is 3, the number of NoMA layers that can be supported by each UE is 4, and each UE may use the four NoMA layers to define an allocation pattern in which the codebook index is superposed to the minimum extent possible. That is, for each UE, the above Table 15 may define a pattern by allocating the codebook index in such a manner that the codebook index is superposed to the minimum extent possible for each layer.

In addition, a UE specific NoMA codebook based on NoMA MCS may be pre-defined by a UE-ID. For example, according to the number of NoMA layers as described below, a codebook index to be used in a UE specific form may be defined by a formula. The following example is a case where the maximum number of NoMA layers and the maximum number of codebook indices is 6. Herein, the codebook index is expressed as 0, . . . , 5.

If # of NoMA Layer=1 by MCS Indices, Codebook Index=mod(UE-ID, 6)
If # of NoMA Layer=2 by MCS Indices, Codebook Indices=mod(UE-ID, 3), mod(UE-ID, 3)+3
If # of NoMA Layer=3 by MCS Indices, Codebook Indices=mod(UE-ID, 2), mod(UE-ID, 2)+2, mod(UE-ID, 2)+4
If # of NoMA Layer=4 by MCS Indices,
:If mod(UE-ID, 3)=1, Codebook Indices=0,1,2,3
:If mod(UE-ID, 3)=2, Codebook Indices=2,3,4,5
:If mod(UE-ID, 3)=3, Codebook Indices=0,1,4,5
If # of NoMA Layer=5 by MCS Indices, Codebook Indices=Codebook Index Set-{mod(UE-ID, 6)}
If # of NoMA Layer=6 by MCS Indices, Codebook Indices=Codebook Index Set For example, upon knowing that the number of NoMA layers is 3 through the MCS index, the UE may know that three codebook indices in total (i.e., a value obtained by performing a modulo operation of 2 with respect to UE-ID, a value obtained by adding 2 to the value obtained by performing the modulo operation of 2 with respect to UE-ID, a value obtained by adding 4 to the value obtained by performing the modulo operation of 2 with respect to UE-ID) are multi-layer codebook indices to be used by the UE.

Although the content related to the modulation order $Q_m$ has been described in all of the aforementioned inventions, it is obvious that the content corresponding to $Q_m'$ can also be calculated and defined in the same calculation manner. Although all of the aforementioned embodiments have been described based on the above Table 3, it is obvious that the MCS table such as Table 4, Table 5, or the like can be equally applied to all schemes. Although the all of the aforementioned inventions have been described based on the content related to the modulation order 2, it is obvious that the inventions can be equally applied to a case where the modulation order is greater than 2.

Although the all of the aforementioned inventions have been described based on the NoMA system in which the NoMA codebook set consists of 6 codebooks, it is obvious that the inventions can also be applied to a case where the number of NoMA codebooks is different, a spreading count is different, or the modulation order to be supported is different.

Although the present invention has been described based on downlink/uplink of a cellular system, it is obvious that the invention can also be applied to all systems which use a multi-user access scheme such as machine type communication (MTC), device-to-device (D2D), vehicle-to-everything (V2X), or the like.

Figure 14:
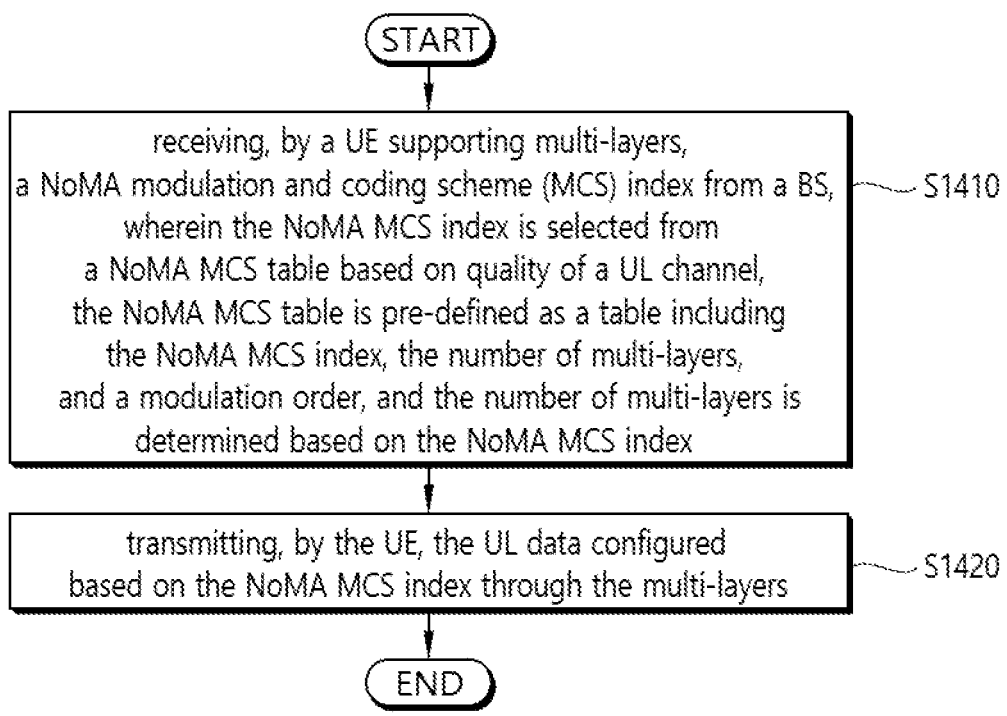
FIG. 14 is a procedural flowchart showing a procedure of transmitting uplink data by applying a non-orthogonal multiple-access scheme according to the present embodiment.

FIG. 14 is a procedural flowchart showing a procedure of transmitting uplink data by applying a non-orthogonal multiple-access scheme according to the present embodiment.

That is, a wireless communication system environment in which a UE supporting multi-layers performs communication by using non-orthogonal multiple access (NoMA) is assumed in the present embodiment. That is, a multi-layer transmission scheme based on NoMA will be proposed as a scheme of transmitting signals for multiple users through superposition in the same time-frequency resource.

First, summarizing terminologies, a layer may correspond to a path through which signals can be transmitted independently in time and frequency resources. Therefore, the layer may also be used in the same meaning as a stream. If a single UE supports a plurality of layers, the layers may be allocated to respective transmit antennas by being multiplied by a specific precoding matrix according to a channel state by means of a precoding module. Therefore, the layer may also mean an antenna layer. The present embodiment assumes a case where the single UE transmits/receives signals through the multi-layers.

In step S1410, the UE receives a NoMA modulation and coding scheme (MCS) index and a codebook index from a BS. The NoMA MCS index and the codebook index may be signaled to the UE through a UL grant. In this case, a non-orthogonal codebook or non-orthogonal codebook set including the codebook index may be pre-defined between the UE and the BS.

The NoMA MCS index is selected from a NoMA MCS table based on quality of a UL channel. The UE may transmit a scheduling request signal to the BS. In this case, the quality of the UL channel may be estimated based on the scheduling request signal.

The NoMA MCS table is pre-defined as a table including the NoMA MCS index, the number of multi-layers, and a modulation order. That is, the NoMA MCS which supports the multi-layers may be defined as a table by the number of multi-layers. The number of multi-layers is determined based on the NoMA MCS index. The codebook index is selected from a codebook set related to the modulation order based on the number of multi-layers.

Since a multi-dimensional modulation (MM) based NoMA technique may have a different codebook set according to a modulation order, a NoMA MCS table may be defined differently for each modulation order. In addition, the NoMA MCS for various modulation orders may be defined as one NoMA MCS table. However, in the present embodiment, since the NoMA MCS table capable of achieving spectral efficiency related to the modulation order of 2 shall be considered, the NoMA MCS table may be defined as shown in the above Table 13.

In addition, the NoMA MCS table may further include a transport block size (TBS) index and a code rate related to the NoMA MCS index. That is, the NoMA MCS index may be defined together with the number of multi-layers, the modulation order, the code rate, and the TBS index. The TBS index may indicate a TBS for the multi-layers. The TBS for the multi-layers may be a value obtained by multiplying a TBS for a single layer by the number of multi-layers. Accordingly, spectral efficiency of the TBS for the multi-layers may also be a value obtained by multiplying the TBS for the single layer by the number of multi-layers.

In step S1420, the UE may transmit the UL data configured based on the NoMA MCA index and/or the codebook index through the multi-layers. The UL data may be spread for each of the multi-layers based on a codebook related to the codebook index, and may be transmitted through superposition with respect to another UE in the same time-frequency resource. The UL data may be transmitted to the BS through xPUSCH.

In addition, the NoMA MCS index may be tied with an index of the codebook set related to the modulation order. The codebook set may be detected from the NoMA MCS index by the UE. Accordingly, the BS does not have to additionally perform signaling on the index of the codebook set.

Hereinafter, a method of allocating a codebook index based on NoMA MCS will be proposed.

For example, the codebook index may be pre-defined as an allocation pattern for each of a plurality of UEs including the aforementioned UE. The allocation pattern may be a pattern which allocates the codebook indices, which are as many as the number of multi-layers, to the UE based on the maximum number of multi-layers and the maximum number of codebook indices.

For example, if the NoMA MCS index is 3, the number of multi-layers that can be supported by each UE is 4, and each UE may use the four NoMA layers to define an allocation pattern in which the codebook index is superposed to the minimum extent possible. That is, for each UE, a pattern may be defined by allocating the codebook index in such a manner that the codebook index is superposed to the minimum extent possible for each layer.

In another embodiment, the codebook index may be defined through a modulo operation using an identification (ID) of the UE based on the maximum number of multi-layers and the maximum number of codebook indices.

For example, if the UE knows that the number of multi-layers is 3 through the NoMA MCS index, the UE may know that three codebook indices in total are multi-layer codebook indices to be used by the UE by using the ID of the UE. The three codebook indices may be obtained, for example, as a value obtained by performing a modulo operation of 2 with respect to UE-ID, a value obtained by adding 2 to the value obtained by performing the modulo operation of 2 with respect to UE-ID, a value obtained by adding 4 to the value obtained by performing the modulo operation of 2 with respect to UE-ID.

Figure 15:
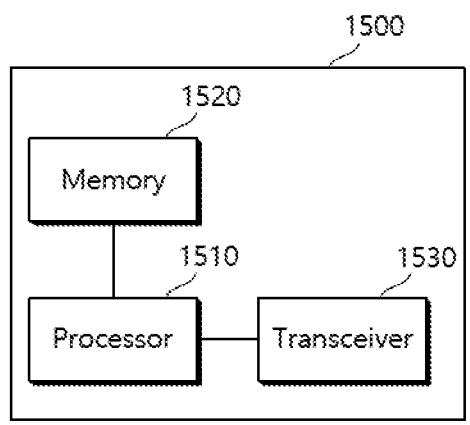
FIG. 15 is a block diagram showing an apparatus for wireless communication for implementing an embodiment of the present invention.

FIG. 15 is a block diagram showing a wireless device to which an exemplary embodiment of this specification can be applied.

Referring to FIG. 15, as a station (STA) that can implement the above-described exemplary embodiment, the wireless device may operate as an AP or a non-AP STA. Additionally, the wireless device may correspond to a user, or the user may correspond to a transmitting device transmitting a signal to the receiving device.

As shown in the drawing, the wireless device of FIG. 15 includes a processor (1510), a memory (1520), and a transceiver (1530). Each of the processor (1510), memory (1520), and transceiver (1530) shown in FIG. 15 may be implemented as a separate chip, or at least two or more blocks/functions may be implemented through a single chip.

The transceiver (1530) is a device including a transmitter and a receiver, and when a specific operation is performed, the transceiver (1530) may perform the operations of any one of the transmitter and the receiver, or the transceiver may perform the operations of both the transmitter and the receiver. The transceiver (1530) may include one or more antennas transmitting and/or receiving radio signals. Additionally, the transceiver (1530) may include an amplifier for amplifying a reception signal and/or a transmission signal and a band-pass filter for performing transmission over a specific frequency band.

The processor (1510) may implement functions, processes, and/or methods proposed in this specification. For example, the processor (1510) may perform operations according to the above-described exemplary embodiment of this specification. More specifically, the processor (1510) may perform the operations disclosed in the exemplary embodiment shown in FIG. 1 to FIG. 14.

The processor (1510) may include an application-specific integrated circuit (ASIC), a separate chipset, a logic circuit, a data processing unit, and/or a converter inter-converting baseband signals and radio signals. The memory (1520) may include a read-only memory (ROM), a random access memory (RAM), a flash memory, a memory card, a storage medium, and/or other equivalent storage devices.

Figure 16:
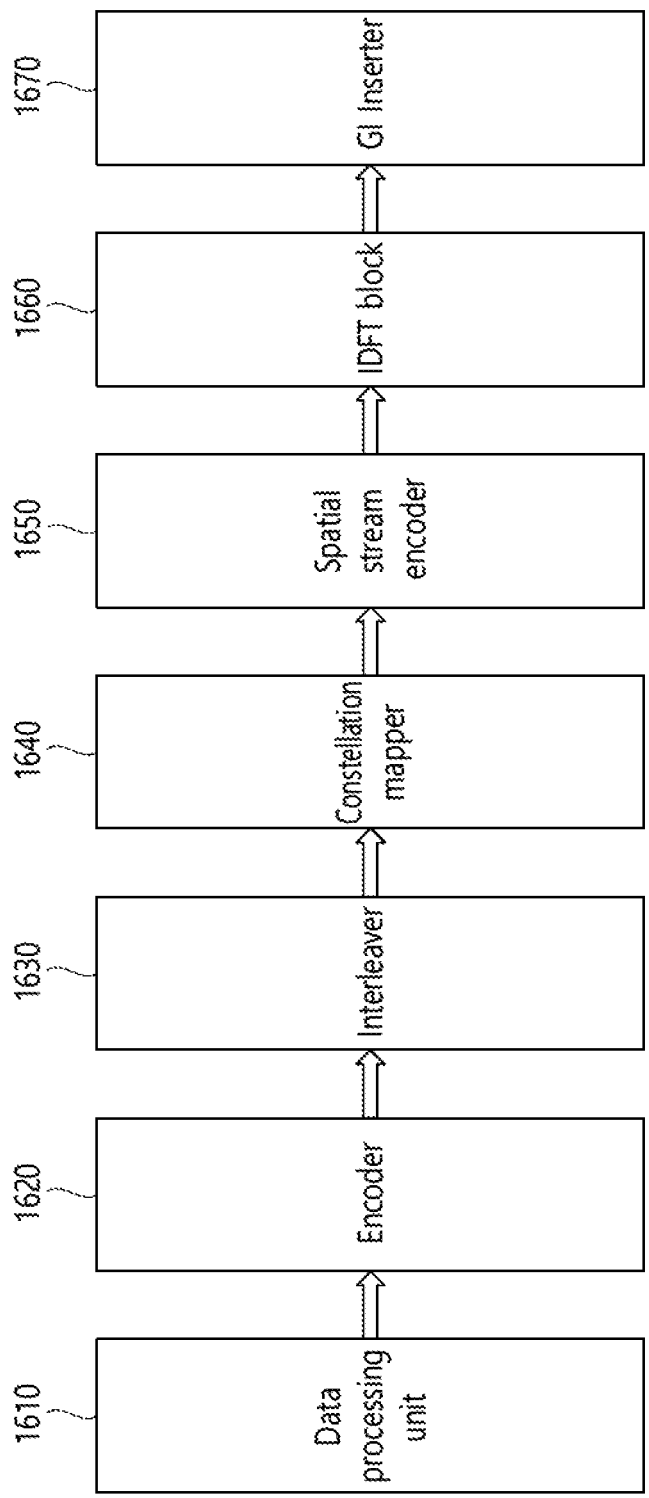
FIG. 16 is a block diagram showing an example of a device being included in a processor.

FIG. 16 is a block diagram showing an example of a device being included in a processor. For simplicity in the description, although an example of FIG. 16 is described based on a block for a transmission signal, it will be apparent that a reception signal may be processed by using the corresponding block.

A data processing unit (1610) shown in FIG. 16 generates transmission data (control data and/or user data) corresponding to a transmission signal. An output of the data processing unit (1610) may be inputted to an encoder (1620). The encoder (1620) may perform coding by using binary convolutional code (BCC) or low-density parity-check (LDPC) coding schemes. At least one encoder (1620) may be included herein, and the number of encoders (1620) may be determined based on diverse information (e.g., number of data streams).

An output of the encoder (1620) may be inputted to an interleaver (1630). The interleaver (1630) may perform operations of distributing consecutive bit signals within a radio resource (e.g., time and/or frequency) in order to prevent any burst error, which is caused by fading, and so on. At least one interleaver (1630) may be included herein, and the number of interleavers (1630) may be determined based on diverse information (e.g., number of spatial streams).

An output of the interleaver (1630) may be inputted to a constellation mapper (1640). The constellation mapper (1640) may perform constellation mapping, such as biphase shift keying (BPSK), Quadrature Phase Shift Keying (QPSK), n-quadrature amplitude modulation (QAM), and so on.

An output of the constellation mapper (1640) may be inputted to a spatial stream encoder (1650). The spatial stream encoder (1650) performs data processing in order to transmit a transmission signal via at least one spatial stream. For example, the spatial stream encoder (1650) may perform at least one of space-time block coding (STBC), Cyclic shift diversity (CSD) insertion, and spatial mapping on the transmission signal.

An output of the spatial stream encoder (1650) may be inputted to an IDFT (1660) block. The IDFT (1660) block may perform inverse discrete Fourier transform (IDFT) or inverse Fast Fourier transform (IFFT).

An output of the IDFT (1660) block is inputted to a Guard Interval (GI) inserter (1670), and an output of the GI inserter (1670) is inputted to the transceiver (1530) of FIG. 15.

What is claimed is:

1. A method of transmitting uplink (UL) data in a wireless communication system to which a non-orthogonal multiple access (NoMA) scheme is applied, the method comprising:

receiving, by a terminal supporting multi-layers, a NoMA modulation and coding scheme (MCS) index from a base station,
wherein the NoMA MCS index is selected from a NoMA MCS table based on quality of a UL channel, the NoMA MCS table is pre-defined as a table including the NoMA MCS index, the number of multi-layers, and a modulation order, and the number of multi-layers is determined based on the NoMA MCS index; and
transmitting, by the terminal, the UL data configured based on the NoMA MCS index through the multi-layers.

2. The method of claim 1, further comprising
receiving, by the terminal, a codebook index from the base station,
wherein the codebook index is selected from a codebook set related to the modulation order based on the number of multi-layers, and
wherein the NoMA MCS index and the codebook index are signaled through the UL grant.

3. The method of claim 2, wherein the UL data is spread for each of the multi-layers based on a codebook related to the codebook index, and is transmitted by overlapping with another terminal in the same time-frequency resource.

4. The method of claim 1, further comprising
transmitting, by the terminal, a scheduling request signal to the base station,
wherein the quality of the UL channel is estimated based on the scheduling request signal.

5. The method of claim 1,
wherein the NoMA MCS table further includes a transport block size (TBS) index and a code rate related to the NoMA MCS index,
wherein the TBS index includes information on a TBS for the multi-layers, and
wherein the TBS for the multi-layers is a value obtained by multiplying a TBS for a single layer by the number of multi-layers.

6. The method of claim 2,
wherein the NoMA MCS index is tied with an index of the codebook set related to the modulation order, and
wherein the codebook set is detected from the NoMA MCS index by the terminal.

7. The method of claim 2,
wherein the codebook index is pre-defined as an allocation pattern for each of a plurality of terminals including the terminal, and
wherein the allocation pattern is a pattern which allocates the codebook indices, which are as many as the number of multi-layers, to the terminal based on the maximum number of multi-layers and the maximum number of codebook indices.

8. The method of claim 2, wherein the codebook index is defined through a modulo operation using an identification (ID) of the terminal based on the maximum number of multi-layers and the maximum number of codebook indices.

9. A terminal for transmitting uplink (UL) data and supporting multi-layers in a wireless communication system to which a non-orthogonal multiple access (NoMA) scheme is applied, the terminal comprising:
a transceiver transmitting and receiving a radio signal; and
a processor coupled to the transceiver, wherein the processor is configured to:
receive a NoMA modulation and coding scheme (MCS) index from a base station, wherein the NoMA MCS index is selected from a NoMA MCS table based on quality of a UL channel, the NoMA MCS table is pre-defined as a table including the NoMA MCS index, the number of multi-layers, and a modulation order, and the number of multi-layers is determined based on the NoMA MCS index; and
transmit the UL data configured based on the NoMA MCS index through the multi-layers.

10. The terminal of claim 9,
wherein the processor receives a codebook index from the base station,
wherein the codebook index is selected from a codebook set related to the modulation order based on the number of multi-layers, and
wherein the NoMA MCS index and the codebook index are signaled through the UL grant.

11. The terminal of claim 10, wherein the UL data is spread for each of the multi-layers based on a codebook related to the codebook index, and is transmitted by overlapping with another terminal in the same time-frequency resource.

12. The terminal of claim 9,
wherein the processor transmits a scheduling request signal to the base station, and
wherein the quality of the UL channel is estimated based on the scheduling request signal.

13. The terminal of claim 9,
wherein the NoMA MCS table further includes a transport block size (TBS) index and a code rate related to the NoMA MCS index,
wherein the TBS index includes information on a TBS for the multi-layers, and
wherein the TBS for the multi-layers is a value obtained by multiplying a TBS for a single layer by the number of multi-layers.

14. The terminal of claim 10,
wherein the NoMA MCS index is tied with an index of the codebook set related to the modulation order, and
wherein the codebook set is detected from the NoMA MCS index by the terminal.

* * * * *